US008835366B2

(12) United States Patent
Patil et al.

(10) Patent No.: US 8,835,366 B2
(45) Date of Patent: *Sep. 16, 2014

(54) LUBRICANT COMPOSITIONS BASED ON BLOCK COPOLYMERS AND PROCESSES FOR MAKING

(75) Inventors: Abhimanyu Onkar Patil, Westfield, NJ (US); Jacob Joseph Habeeb, Westfield, NJ (US); Benjamin Daniel Eirich, Wenonah, NJ (US); Nicole D. Vaughn, Lake Ridge, VA (US); Charles Lambert Baker, Jr., Thornton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/335,172

(22) Filed: Dec. 22, 2011

(65) Prior Publication Data

US 2012/0115763 A1 May 10, 2012

Related U.S. Application Data

(63) Continuation-in-part of application No. 12/974,564, filed on Dec. 21, 2010, now Pat. No. 8,598,102.

(60) Provisional application No. 61/335,031, filed on Dec. 30, 2009.

(51) Int. Cl.

| C10M 169/04 | (2006.01) |
|---|---|
| C07C 211/58 | (2006.01) |
| C10M 107/34 | (2006.01) |
| C08G 73/02 | (2006.01) |
| C08G 81/02 | (2006.01) |
| C08G 65/20 | (2006.01) |
| C08G 65/22 | (2006.01) |
| C08G 65/26 | (2006.01) |

(52) U.S. Cl.
CPC ............ *C08G 65/20* (2013.01); *C10N 2230/06* (2013.01); *C10N 2230/00* (2013.01); *C10M 2205/028* (2013.01); *C10N 2230/70* (2013.01); *C10N 2220/023* (2013.01); *C08G 81/025* (2013.01); *C10M 2205/22* (2013.01); *C08G 65/22* (2013.01); *C10M 2205/04* (2013.01); *C10M 2209/103* (2013.01); *C10M 2203/1025* (2013.01); *C10M 2203/1006* (2013.01); *C10N 2230/10* (2013.01); *C10M 2205/02* (2013.01); *C08G 65/2624* (2013.01); *C10M 2215/042* (2013.01); *C10M 2215/064* (2013.01); *C10M 2205/173* (2013.01); *C10M 2209/084* (2013.01); *C10M 2215/0425* (2013.01); *C10N 2220/021* (2013.01); *C10N 2240/10* (2013.01); *C10N 2230/02* (2013.01); *C08G 2650/50* (2013.01); *C10M 2205/0285* (2013.01); *C10N 2220/022* (2013.01); *C10M 169/041* (2013.01); *C10M 2205/06* (2013.01); *C10M 2207/026* (2013.01)
USPC ........... 508/304; 508/556; 508/579; 508/591; 525/185

(58) Field of Classification Search
USPC ............................ 508/556, 579, 591; 525/185
See application file for complete search history.

(56) References Cited

U.S. PATENT DOCUMENTS

| 5,741,946 A * | 4/1998 | Wei .............................. 568/617 |
| 2003/0195128 A1* | 10/2003 | Deckman et al. ............. 508/591 |
| 2011/0160107 A1* | 6/2011 | Patil et al. ..................... 508/304 |

*Primary Examiner* — Vishal Vasisth
(74) *Attorney, Agent, or Firm* — Robert A. Migliorini

(57) ABSTRACT

Provided are lubricant compositions with improved oxidative stability and frictional and wear resistance properties for use in engine oil applications. The lubricant compositions include: i) a first base stock selected from a Group I base stock, a Group II base stock or a combination thereof at 50 to 80 wt %; ii) a block copolymer at 1 to 10 wt %; iii) a viscosity modifier at 3 to 15 wt % selected from polymers and copolymers of methacrylate, butadiene, olefins and alkylated styrenes; and iv) an additive package including a combination of antioxidants, dispersants, detergents, friction modifiers and antiwear agents at 2 to 30 wt %.

30 Claims, 1 Drawing Sheet

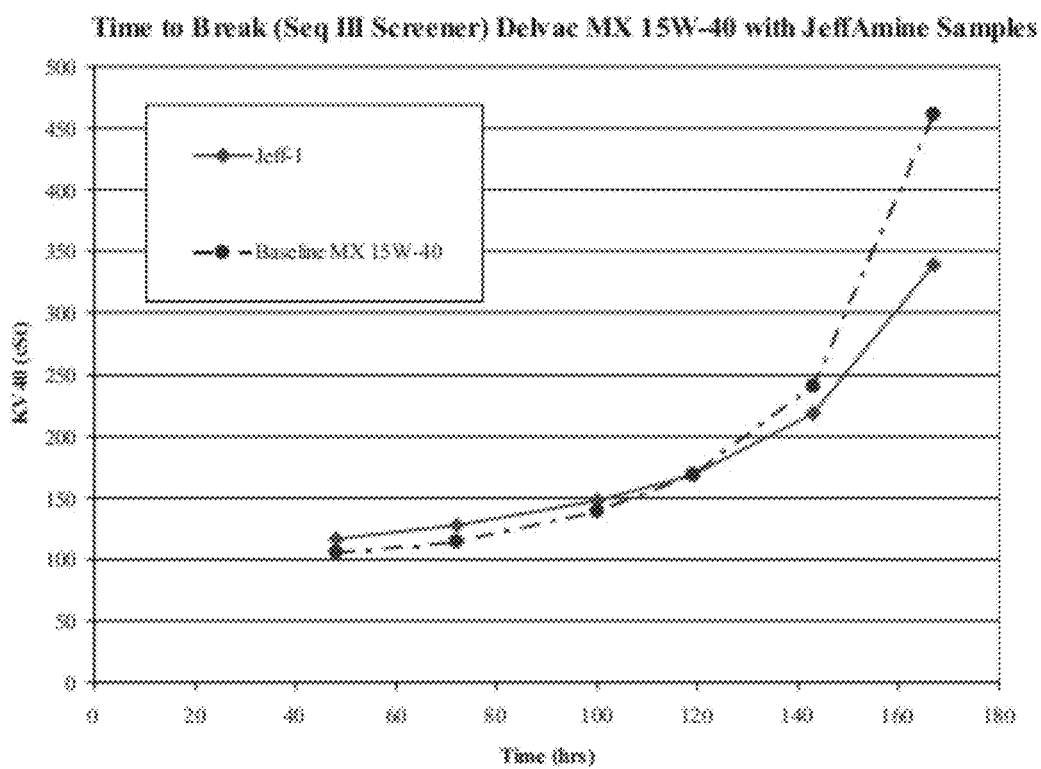

US 8,835,366 B2

LUBRICANT COMPOSITIONS BASED ON BLOCK COPOLYMERS AND PROCESSES FOR MAKING

CROSS-REFERENCE TO RELATED APPLICATION

This application is a Continuation-in-Part of U.S. patent application Ser. No. 12/974,564 filed Dec. 21, 2010, and claims priority to U.S. Provisional Application No. 61/335,031 filed Dec. 30, 2009, herein incorporated by reference in its entirety.

FIELD

The present disclosure relates to lubricant compositions that exhibit improved frictional properties and wear and oxidative stability due to the inclusion of a polymer obtained from hydrocarbon moiety (e.g., poly-$\alpha$-olefins (PAO)) having terminal functional groups and a polyether moiety (e.g., polyalkylene glycols (PAG)) having terminal functional groups. The present disclosure further relates to processes for making such lubricant compositions.

BACKGROUND

Lubricant fuel/energy efficiency is a critical feature for future lubricants. In order to provide step-out fuel economy while maintaining or improving other performance features for lubricants, base stocks with lower friction coefficients are needed.

A useful lubricant base stock is the PAO class of fluids. PAOs are highly stable, versatile and compatible with a wide range of materials. PAOs have many advantages over conventional mineral oil or high-quality Group III or Group III+ lubricants. More specifically, PAOs have superior viscosity index (VI), low temperature properties (CCS (crankcase simulation), MRV (mini-rotary viscometer), and the like), low pour points, good additive response and complete miscibility with conventional mineral oil. PAOs are considered by the industry to be the best of hydrocarbon-type lubricants.

Another useful lubricant base stock is the PAG class of fluids. Advantages of PAG fluids include high VI, good lubricity (in hydrodynamic, mix, and boundary lubrication conditions) and excellent cleanliness. PAG fluids have numerous drawbacks. PAG fluids are not miscible or compatible with conventional mineral or hydrocarbon-based lubricants. PAGs are polar and have very low friction/traction for energy efficiency. PAG fluids are water-soluble, which results in severe corrosion problem. Some PAG fluids also have paint and/or seal compatibility problem.

SUMMARY

In one form of the present disclosure, provided are lubricant compositions for use in engine oil applications including: i) a first base stock selected from a Group I base stock, a Group II base stock or a combination thereof at 50 to 80 wt % of the composition, ii) a block copolymer at 1 to 10 wt % of the composition having an "A" block of a functionalized hydrocarbon moiety including one or more functional end groups selected from: epoxides, amines, acids, acid chlorides, acid anhydrides, halogens, vinyl or vinylidene double bonds, aromatic rings and thiols; and a "B" block of a functionalized polyether moiety including one or more functional end groups selected from: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, wherein the hydrocarbon moiety and the polyether moiety are copolymerizable therewith, iii) a viscosity modifier selected from polymers and copolymers of methacrylate, butadiene, olefins and alkylated styrenes at 3 to 15 wt % of the composition, and iv) an additive package including a combination of antioxidants, dispersants, detergents, friction modifiers and antiwear agents at 2 to 30 wt % of the composition.

In another form of the present disclosure, the lubricant compositions have improved oxidative stability, frictional properties and/or wear resistance properties in engine oil lubrication applications.

In yet another form of the present disclosure, a method of making lubricant compositions for use in engine oil applications includes providing the following components: i) a first base stock selected from a Group I base stock, a Group II base stock or a combination thereof, ii) a block copolymer having an "A" block of a functionalized hydrocarbon moiety including one or more functional end groups selected from: epoxides, amines, acids, acid chlorides, acid anhydrides, halogens, vinyl or vinylidene double bonds, aromatic rings and thiols; and a "B" block of a functionalized polyether moiety including one or more functional end groups selected from: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, wherein the hydrocarbon moiety and the polyether moiety are copolymerizable therewith, iii) a viscosity modifier selected from polymers and copolymers of methacrylate, butadiene, olefins and alkylated styrenes, and iv) an additive package including a combination of antioxidants, dispersants, detergents, friction modifiers and antiwear agents, and then blending 50 to 80 wt % of the first base stock, 1 to 10 wt % of the block copolymer, 3 to 15 wt % of the viscosity modifier, and 2 to 30 wt % of the additive package to form the lubricant composition.

BRIEF DESCRIPTION OF THE DRAWINGS

FIG. 1 is graph of the oxidative stability of a lubricant composition with the PAO-PAG block copolymer versus a control not including the PAO-PAG block copolymer.

DETAILED DESCRIPTION

An numerical values within the detailed description and the claims herein are modified by "about" or "approximately" the indicated value, and take into account experimental error and variations that would be expected by a person having ordinary skill in the art.

The lubricant of the present disclosure may have Group I base stocks and/or Group II base stocks as first base stocks. The lubricants of the present disclosure may optionally have a second base stock, such as a Group III base stock, GTL base stock, or PAO base stock. Useful Group I-III base stocks have a $Kv_{100}$ kinetic viscosity) of between 3 to 50 cSt, or 4 to 20 cSt, or 3 to 5 cSt. API Groups I, II, and III represent base stocks typically refined from crude oil and are differentiated by viscosity index (VI), saturation content, and sulfur content.

The specifications for the lube base oils are defined in the API Interchange Guidelines (API Publication 1509) using sulfur content, saturates content, and viscosity index, as follows:

| Group | Sulfur (ppm) | Saturates (%) | Viscosity Index (VI) |
|---|---|---|---|
| I | >300 | <90 | 80-120 |
| II | <300 | >90 | 80-120 |
| III | <300 | >90 | >120 |
| IV | All Polyalphaolefins (PAOs) | | |
| V | All Stocks Not Included in Groups I-IV | | |

PAOs are a class of hydrocarbons that can be manufactured by the catalytic oligomerization (polymerization to low-molecular-weight products) of linear α-olefin (LAO) monomers. These typically range from 1-octene to 1-dodecene, or 1-octene to 1-tetradecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein, all of which are incorporated by reference in their entireties. PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAO's). PAO's of different viscosity grades are typically produced using promoted BF or AlCl$_3$ catalysts.

Specifically, PAOs may be produced by the polymerization of olefin feed in the presence of a catalyst, such as AlCl$_3$, BF$_3$, or promoted AlCl$_3$ or BF$_3$. Processes for the production of PAOs are disclosed, for example, in the following patents: U.S. Pat. Nos. 3,149,178; 3,382,291; 3,742,082; 3,769,363; 3,780,128; 4,172,855 and 4,956,122, which are fully incorporated herein by reference. PAOs are also discussed in the following: Will, J. G. *Lubrication Fundamentals*, Marcel Dekker: New York, 1980. Subsequent to polymerization, the PAO lubricant range products are typically hydrogenated in order to reduce the residual unsaturation, generally to a level of greater than 90% of hydrogenation. High viscosity PAO's may be conveniently made by the polymerization of an alpha-olefin in the presence of a polymerization catalyst such as Friedel-Crafts catalysts. These include, for example, boron trifluoride, aluminum trichloride, or boron trifluoride, promoted with water, with alcohols such as ethanol, propanol, or butanol, with carboxylic acids, or with esters such as ethyl acetate or ethyl propionate or ether such as diethyl ether, and diisopropyl ether. (See for example, the methods disclosed by U.S. Pat. Nos. 4,149,178 and. 3,382,291.) Other descriptions of PAO synthesis are found in the following: U.S. Pat. Nos. 3,742,082; 3,769,363; 3,876,720; 4,239,930; 4,367,352; 4,413,156; 4,434,408; 4,910,355; 4,956,122; and 5,068,487, all of which are incorporated in their entirety herein by reference.

Another class of HVI-PAOs may be prepared by the action of a supported, reduced chromium catalyst with an alpha-olefin monomer. Such PAOs are described in U.S. Pat. Nos. 4,827,073; 4,827,064; 4,967,032; 4,926,004; and 4,914,254. Commercially available PAOs include SpectraSyn™ 2, 4, 5, 6, 8, 10, 40, 100 and SpectraSyn Ultra™ 150, SpectraSyn Ultra™ 300, SpectraSyn Ultra™ 1000, etc. (ExxonMobil Chemical Company, Houston, Tex.). Also included are PAOs prepared the presence of a metallocene catalyst with a non-coordinating anion activator and hydrogen as discussed in U.S. Published Patent Application No. 2008/0177121.

Other important lube base stocks are those derived from one or more Gas-to-Liquids materials (GTLs). GTL materials that are derived via one or more synthesis, combination, transformation, rearrangement, and/or degradation/deconstructive processes from gaseous carbon-containing compounds. GTLs are disclosed as tube base stocks, for example, in U.S. Published Application No. 2007/0265178, which is incorporated herein by reference.

Other important lube base stocks are the Groups I, II, and III base stocks. Groups I, II, and III base stocks are disclosed in "Synthetics, Mineral Oils and Bio-Based Lubricants, Chemistry and Technology" Edited by L. R. Rudnick, published by CRC Press, Taylor & Francis, 2005, which is incorporated herein by reference.

GTL base oils comprise base stocks obtained from GTL materials that are derived via one or more synthesis, combination, transformation, rearrangement, and/or degradation/deconstructive processes from gaseous carbon-containing compounds. Preferably, the GTL base stocks are derived from the Fischer-Tropsch (F-T) synthesis process wherein a synthesis gas comprising a mixture of H$_2$ and CO is catalytically converted to lower boiling materials by hydroisomerization and/or dewaxing. The process is described, for example, in U.S. Pat. Nos. 5,348,982 and 5,545,674, and examples of suitable catalysts are described in U.S. Pat. No. 4,568,663, each of which is incorporated herein by reference.

GTL base stocks are characterized typically as having kinematic viscosities at 100° C. of from 2 cSt to 50 cSt, preferably from 3 cSt to 50 cSt, more preferably from 3.5 cSt to 30 cSt. The GTL base stock and/or other hydrodewaxed, or hydroisomerized/catalytically (or solvent) dewaxed wax derived base stocks used in the present disclosure have kinematic viscosities at 100° C. in the range of 3.5 cSt to 7 cSt, preferably 4 cSt to 7 cSt, more preferably 4.5 cSt to 6.5 cSt.

Manufacturing plants that make Group I base oils typically use solvents to extract the lower viscosity index (VI) components and increase the VI of the crude to the specifications desired. These solvents are typically phenol or furfural. Solvent extraction gives a product with less than 90% saturates and more than 300 ppm sulfur. The majority of the lube production in the world is in the Group I category.

Manufacturing plants that make Group ii base oils typically employ hydroprocessing such as hydrocracking or severe hydrotreating to increase the VI of the crude oil to the specifications value. The use of hydroprocessing typically increases the saturate content above 90 and reduced the sulfur below 300 ppm. Approximately 10% of the lube base oil production in the world is in the Group II category, and 30% of U.S. production is Group II.

Manufacturing plants that make Group III base oils typically employ wax isomerization technology to make very high VI products. Since the starting feed is waxy vacuum gas oil (VGO) or wax which contains all saturates and little sulfur, the Group III products have saturate contains above 90 and sulfur content below 300 ppm.

PAO-PAG Block Copolymer Component

A process for making a block copolymer, comprising: copolymerizing a functionalized hydrocarbon moiety and a functionalized polyether moiety, wherein the functionalized hydrocarbon moiety includes one or more functional end groups selected from the group consisting of: epoxides, amines, acids, acid chlorides, acid anhydrides, halogens, vinyl or vinylidene double bonds, aromatic rings and thiols, and wherein the functionalized polyether moiety includes one or more functional end groups selected from the group consisting of: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, and wherein the hydrocarbon moiety and the polyether moiety are copolymerizable therewith.

Preferably, the copolymerization takes place at a temperature of 0° C. to 200° C., more preferably between 20° C. to 120° C. The copolymerization takes place for a time of 0.5 h to 36 h, more preferably between 1 h to 24 h.

A lubricant base stock that exhibits desirable performance attributes due to the polymerization of a hydrocarbon moiety (e.g., poly-α-olefins (PAO)) having one or more functional end groups and a polyether moiety (e.g., polyalkylene glycols (PAG)) having one or more functional end groups. More particular, chemically coupled PAO-PAG block polymers of a hydrocarbon segment, such as those of poly-α-olefin (PAO), and a polyether segment, such as poly(alkylene glycol) (PAG), can be employed as low molecular weight synthetic lubricant base stocks.

The hydrocarbon segment can be a long chain alkane, a poly-α-olefin or a low molecular weight polyethylene, propylene or ethylene-α-olefin macromer. The macromer is a unit having between 16 to 40 carbon atoms derived from ethylene, propylene or α-olefins, and combinations of the foregoing. The olefin monomeric units are derived from one or more internal olefins. Alternatively, the olefin monomeric units are derived from one or more olefins including 1-hexene, 1-octene, 1-nonene, 1-decene, 1-undecene, 1-dodecene, 1-tetradecene, 1-hexadecene or 1-octadecene. Still further, the olefin monomeric unit is a low molecular weight oligomer prepared via a metallocene catalytic reaction. The low molecular weight oligomer is a dimer of 1-decene, 1-decene, 1-hexene, 1-tetradecene or mixtures thereof.

The polyether segment can be a polyalkylene glycol, such as ethylene glycol, propylene glycol, polybutylene glycol, or combinations thereof.

These segments are preferably coupled by chemical reaction of functional groups that can be attached to either the hydrocarbon segment and/or the polyether segment. Preferred schemes of coupling reactions are depicted below:

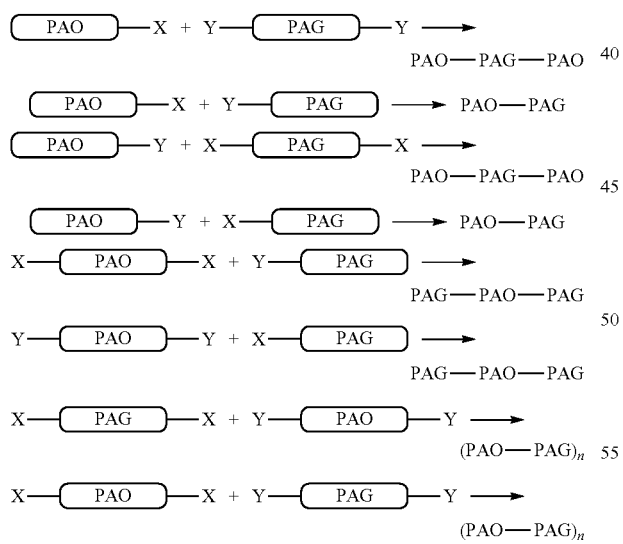

wherein X and Y are functional groups, such as amines, epoxides, acids, acid halides, halides, alcohols, esters, ketones, vinyl or vinylidene double bonds, substituted aromatic groups, phenols, and thiols.

As one example, the PAO/PAG block copolymers substantially maintain the respective benefits of both PAG and PAO fluids while unexpectedly eliminating or diminishing their respective disadvantages. Notably, the block copolymers provide surprisingly superior step-out fuel economy and energy efficiency When used in automotive engine lubricants and industrial and grease lubricants.

Three reaction sequences are particularly preferred in making the PAO-PAG block copolymers.

The first preferred sequence is the reaction of an alkyl glycidyl ether with a Jeffamine® to obtain a PAO-PAG block copolymer fluid.

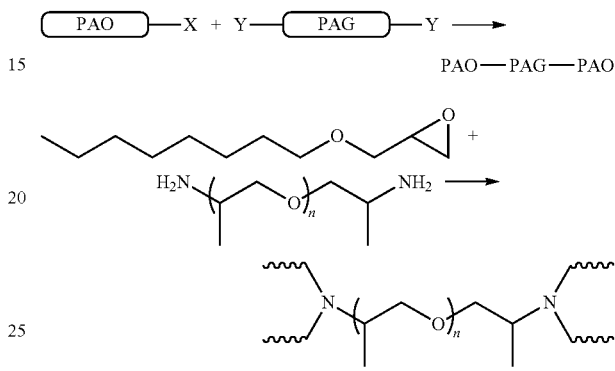

The PAO in above reaction is a $C_8/C_{10}$ alkyl glycidyl ether wherein X is an epoxide and PAG is an polyether amine (Jeffamine®) wherein Y is an amine.

The second preferred sequence is the reaction of an alkyl epoxide ($C_{20}$-epoxy) with a Jeffamine® to obtain a PAO-PAG block copolymer fluid.

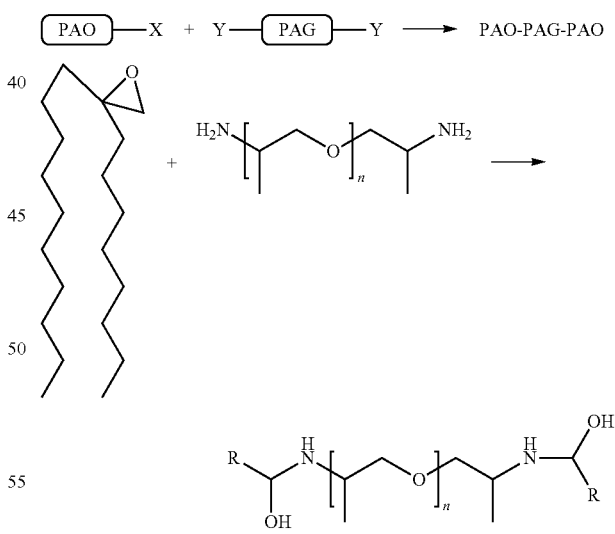

The PAO-PAG shown above is similar to the structure depicted in the first sequence except the PAO is a long chain alkyl group (rather than a glycidyl ether) wherein X is an epoxide group and PAG is a polyether amine (Jeffamine®) wherein Y is an amine group.

The third preferred sequence is the reaction of a poly(alkylene glycol) diglycidyl ether with an alkylamine to obtain a PAO-PAG fluid.

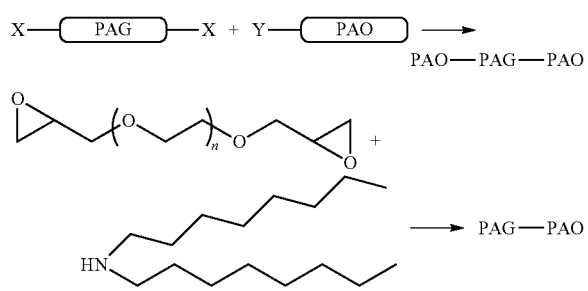

The PAO/PAG block copolymer shown above has a diepoxide as a part of the polyether segment (PAG) and an amine as a part of hydrocarbon (PAO) segment, wherein X is an epoxide group and Y is an amine group.

Polyethylene glycol-containing diepoxides with dioctylamine can be reacted to obtain a low molecular weight synthetic fluid. For example, poly(ethyleneglycol) diglycidyl ether (MW of 526) and dioctylamine can be reacted to obtain a liquid product that has excellent lube properties like PAO. Besides poly(ethyleneglycol) diglycidyl ether, other diepoxides that contain polyether segments can be reacted with amines. Further, Armeen amines other than dioctylamine can be reacted with epoxides.

Epoxides can be prepared by epoxidation of unhydrogenated PAO (PAO with terminal double bond) or of other hydrocarbon macromers, such as polyethylene (PE), polypropylene (PP), ethylene propylene (EP), ethylene butylene (EB), polyisobutylene (PIB), poly-n-butylene (PNB) macromers, or of alkyl glycidyl ethers.

The macromer is a having between 16 to 40 carbon atoms derived from ethylene, propylene, or α-olefins, and combinations of the foregoing. The olefin monomeric units are derived from one or more internal olefins. Alternatively, the olefin monomeric units are derived from one or more olefins including 1-hexene, 1-octene, 1-nonene, 1-decene, 1-undecene, 1-dodecene, 1-tetradecene, or 1-octadecene. Still further, the olefin monomeric unit is a low molecular weight oligomer prepared via a metallocene catalytic reaction. The low molecular weight oligomer is a dimer of 1-decene, 1-decene, 1-hexene, 1-tetradecene or mixtures thereof.

Olefins are epoxidized using an epoxidation catalyst to produce a terminally epoxidized macromer. Epoxidation of the present olefin materials can be affected using a peracid, such as performic acid, perbenzoic acid or m-chloroperbenzoic acid, as the oxidizing agent. The oxidation reaction can be performed using a preformed peracid to affect the epoxidation, or the peracid can be generated in-situ, for example by the addition of formic acid and hydrogen peroxide to produce performic acid. Formic acid can be added in a molar ratio to the olefin double bonds of from 10:1 to 30:1. Hydrogen peroxide can be added to the reaction mixture in a molar ratio to the olefin double bonds of from 1.01:1 to 5:1. Addition of both formic acid and $H_2O_2$ to the reaction mixture results in the in situ formation of performic acid as an epoxidizing agent. Typically, the epoxidation is conducted at a temperature ranging from 25° C. to 100° C., preferably from 30° C. to 70° C. Suitable reaction times will generally range from 0.1 hour to 36 hours, such as from 1 hour to 24 hours. Epoxidation reactions can provide conversion from 50 to 100% of the double bonds into oxirane groups.

The epoxidation reaction is generally carried out in a liquid reaction medium. The reaction medium can comprise only the reactants essentially utilized in the process. More conventionally, however, the liquid reaction medium will comprise a suitable reaction solvent in which the reactants and catalyst materials can be dissolved, suspended or dispersed. Suitable reaction solvents include organic liquids which are inert in the reaction mixture. By "inert" is meant that the solvent does not deleteriously affect the oxidation reaction. Suitable inert organic solvents include aromatic hydrocarbons such as benzene, toluene, xylenes, benzonitrile, nitrobenzene, anisole, and phenyl nonane; saturated aliphatic hydrocarbons having from 5 to 20 carbons, such as pentane, hexane, and heptane; adiponitrile; halogenated hydrocarbons such as methylene chloride, 1,2-dichloroethane, chloroform, carbon tetrachloride and the like; non-fluorinated, substituted saturated aliphatic and/or aromatic hydrocarbons having from 1 to 20 carbons, including those selected from the group consisting of alcohols such as methanol, propanol, butanol, isopropanol, and 2,4-di-t-butylphenol; ketones such as acetone; carboxylic acids such as propanoic acid and acetic acid; esters such as ethyl acetate, ethyl benzoate, dimethyl succinate, butyl acetate, tri-n-butyl phosphate, and dimethyl phthalate; ethers, such as tetraglyme; and mixtures thereof.

One type of epoxidation of olefins involves reaction of the material with a peracid, such as performic acid or m-chloroperbenzoic acid, to provide an epoxidized material having oxirane rings formed at the sites of the residual double bonds within the molecule. Catalytic epoxidation alternatives using hydrogen peroxide as an oxidizing agent instead of peracids can be used to epoxidize some unsaturated materials. Catalysts based on the use of high valent (d0), mostly Ti, V, Mo, W, and Re, metal complexes are known to promote alkene epoxidation with $H_2O_2$. Some notable effective epoxidation catalysts for use with hydrogen peroxide include titanium silicates, peroxophosphotungstates, manganese triazocyclononane, and methylrhenium trioxide.

A poly-α-olefin-polyalkyleneglycol (PAO-PAG) type fluid can be synthesized from a reaction of an alkyl epoxide ($C_{20}$-epoxy) with a polyether amine. Polyether amines, such as the Jeffamines®, can be reacted with an epoxide terminated hydrocarbon molecule (PAO-epoxide or $C_{20}$-epoxy) to obtain a low molecular weight synthetic fluid that can be used as synthetic base stock.

The Jeffamines® can be amine-terminated polyethers. The reaction of amine-terminated polyethers and epoxides can be carried out neat or in solvents like THF, MEK or ethanol. The temperature of the reaction can be 25° C. to 60° C. or higher. The reaction time can be a few hours to few days.

The Jeffamines® can be amine-terminated polyethers such as polyethylene oxide (PEO), polypropylene oxide (PPO) or combination of PEO/PPO copolymers. For example, some of the commercial polyethers include: poly(ethyleneglycol) bis (3-aminopropylether) (34901-14-9, mw 1500), poly(propyleneglycol) bis(2-aminopropylether) (mw 230), poly(propyleneglycol) bis(2-aminopropylether) (mw 400), poly (propyleneglycol) bis(2-aminopropylether) (9046-10-0, mw 2000), poly(propyleneglycol) bis(2-aminopropylether) (mw 4000), poly(propyleneglycol)-block-poly(ethyleneglycol)-block poly(propyleneglycol) bis(2-aminopropylether) (65605-36-9) (3.5:8.5) (PO:EO) (mw 600), poly(propyleneglycol)-block-poly(ethyleneglycol)-block poly(propyleneglycol) bis(2-aminopropylether) (3.5:15.5) (PO:EO) (mw 900), poly(propyleneglycol)-block-poly(ethyleneglycol)-block poly(propyleneglycol) bis(2-aminopropylether) (3.5:40.5) (PO:EO) (mw 2000), glycerol tris[poly(propylene glycol), amine terminated] ether (64852-22-8, mw 3000 or mw 440), poly(tetrahydrofuran), bis(3-aminopropyl) terminated (72088-96-1), and the like.

The chemical structures of examples of amine-terminated polyethers are shown below:

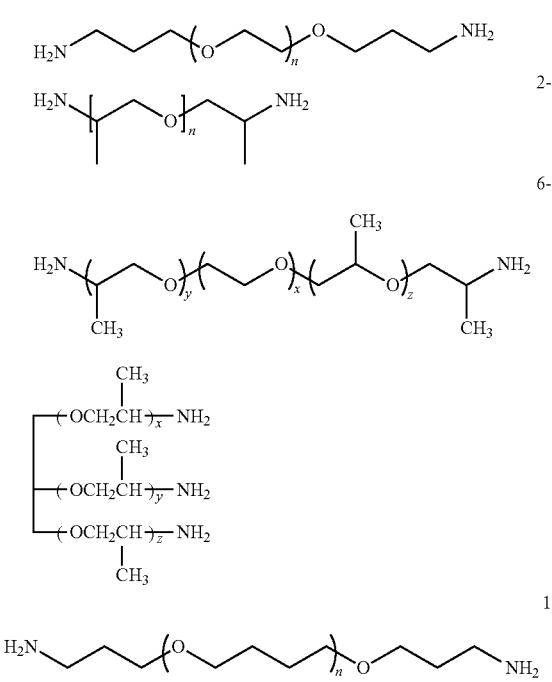

Jeffamines® can be monoamines that are prepared by reaction of a monohydric alcohol initiator with ethylene and/or propylene oxide, followed by conversion of the resulting terminal hydroxyl group to an amine. These products are produced by Huntsman as Jeffamine® monoamines (M series).

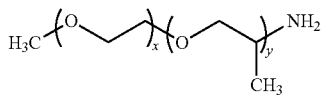

The molecular weights of the product can be 600, 1000, etc.

In this case, the sequence is the reaction of an alkyl epoxide or alkyl diepoxide with monoamine polyether to obtain a PAO-PAG fluid.

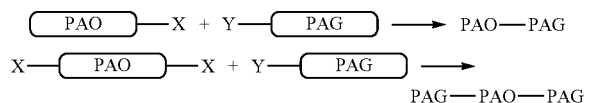

The reaction of amine-terminated polyethers and epoxides can be carried out neat or in solvents like THF, MEK or ethanol. The temperature of the reaction can be 25° C. to 60° C. or higher. The reaction time can be a few hours to few days.

The chemically coupled macromolecules of the present disclosure is useful as a lubricant base stock or a functional fluid and preferably has a 100° C. kinematic viscosity of 1.5 cSt to 3000 cSt according to the ASTM D445 method. The copolymer has a 40° C. kinematic viscosity of 3 to 15000 cSt. Preferred polymers exhibit a high viscosity index (VI). The VI typically ranges from 70 to 300 depending on viscosity, amount of hydrocarbon segment units, amount of alkylene oxide units, type of hydrocarbon segment or alkylene oxide units, method of synthesis, chemical compositions, and the like. Pour points are generally below −5° C. even in the case of the higher molecular weight oligomers with viscosities (100° C.) of 20 cSt or higher. Pour points (ASTM D97 or equivalent) generally range between −20 and −55° C. and usually below −25° C. Product viscosity may vary in view of factors such as polymerization conditions reaction temperature and reaction time. The lubricant fraction of the product will typically be a material having a viscosity between 4 cSt to 3000 cSt (at 100° C.), but lower viscosity products between 1.5 cSt to 40 cSt (at 100° C.) may also be obtained for use in lubricants in which a low viscosity base stock is desired.

The molecular weight of the polymer typically ranges from 200 to 20,000, typically from 300 to 10,000, and most typically from 350 to 7,500. Higher molecular weights and corresponding viscosities may be achieved by suitable choice of starting hydrocarbon segment, polyether segment and number of functional groups and reaction conditions. Values of the polydispersity index (PDI) are typically from 1.5 to 3.0.

The polymer can take the form of a block copolymer or multi-blocks or dendritic or star type or combination of those. The polymer optionally may contain minor amounts of unreacted hydrocarbon segment or polyether segment as long as a homogeneous mixture can be obtained.

For automotive engine lubricant formulations, it is generally preferred to have lower viscosity fluids, e.g., below 10 cSt. Lower viscosity is known to impart lower viscous drag thus offering better energy efficiency or fuel economy. Both low viscosity and high viscosity fluids are useful in industrial lubricant formulations to yield different ISO vis grad lubricants. For industrial lubricant formulations, it is generally important to use fluids of high VI and high hydrolytic stability.

For both engine and industrial lubricant application, it is important to have a lubricant formulation with a low friction coefficient. Generally fluids with low friction coefficients exhibit low frictional loss during lubrication and fluids with high friction coefficients exhibit high frictional loss during lubrication. Low frictional loss is critical for improved energy or fuel efficiency of formulated lubricants.

Friction coefficients can be measured by a High Frequency Reciprocating Rig (HFRR) test. The test equipment and procedure are similar to the ASTM D6079 method except the test oil temperature is raised from 32° C. to 195° C. at 2° C./minute, 400 g load, 60 Hz frequency. The test can measure average friction coefficient and wear volume.

The PAO-PAG copolymers may take any form of block copolymer, such as diblock, repeating block, and the like.

Other teachings to useful PAO and PAG fluids and processes for making are disclosed in *Synthetics, Mineral Oils, and Bio-Based Lubricants, Chemistry and Technology*, by L. R. Rudnick, CRC Press, CO ©2006.

PAO-PAG fluids formed by combining a PAO type structure with a PAG structure maintain the benefits of both PAO (good VI, PP, and miscibility) and PAG (low friction coefficient) fluids. The fluids are very good lubricant base stocks. The fluids are soluble in hydrocarbon fluids. Thus, these fluids can be used along with other base stocks, such as poly-α-olefins, Group III+ type fluids (Visom, GTL, etc) and Group I-III base stocks.

Lubricant Compositions

The PAO-PAG block copolymer of the present disclosure may be included in an engine oil formulation to yield improved oxidative stability, wear resistance properties and frictional properties. In one form of the present disclosure, a lubricant composition for use in engine oil applications includes: i) a first base stock selected from a Group I base stock, a Group II base stock and a combination thereof at 50 to 80 wt % of the lubricant composition, and ii) a block copolymer at 1 to 10 wt % of the lubricant composition, including: an "A" block of a functionalized hydrocarbon moiety including one or more functional end groups selected from: epoxides, amines, acids, acid chlorides, acid anhydrides, halogens, vinyl or vinylidene double bonds, aromatic rings and thiols; and a "B" block of a functionalized polyether moiety including one or more functional end groups selected from: epoxides, amines, acids, acid chlorides, acid anhydrides, halogens, vinyl or vinylidene double bonds, aromatic rings and thiols, wherein the end group of the polyether moiety is different than the end group of the hydrocarbon moiety, wherein the hydrocarbon moiety and the polyether moiety are copolymerizable therewith. Alternatively, the first base stock may be included at 55 to 75 wt %, or GO to 70 wt % of the lubricant formulation. in one advantageous form, the first base stock is included at 73 wt % of the lubricant composition and comprises 53 wt % of a Group I oil and 20 wt % of a Group II oil.

Alternatively, the block copolymer fluid may be included at 2 to 8 wt %, or 3 to 6 wt % of the lubricant composition. In one particularly advantageous form, the block copolymer fluid has a hydrocarbon moiety of a poly-α-olefin and a polyether moiety of a polyalkylene glycol and is included in the lubricant composition at 3 wt %.

Viscosity Modifier/Improver

The lubricant compositions disclosed herein may also include one or more viscosity modifiers/viscosity improvers as part of the lubricant composition. Viscosity modifiers (also known as Viscosity Index modifiers, VI modifiers, Viscosity index improvers, and VI improvers) increase the viscosity of the oil composition at elevated temperatures which increases film thickness, while having limited effect on viscosity at low temperatures.

Suitable viscosity modifiers include high molecular weight hydrocarbons, polyesters and viscosity index improver dispersants that function as both a viscosity index improver and a dispersant. Typical molecular weights of these polymers are between 10,000 to 1,000,000, more typically 20,000 to 500,000, and even more typically between 50,000 and 200,000.

Examples of suitable viscosity improvers are polymers and copolymers of methacrylate, butadiene, olefins, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

The amount of viscosity modifier may range from zero to 25 wt %, or 0.2 to 20 wt %, or advantageously 3 to 15 wt %, or more advantageously 5 to 13 wt %, or still more advantageously 6 to 10 wt %, based on active ingredient and depending on the specific viscosity modifier used. In one particularly advantageous form, the viscosity modifier is an olefin copolymer viscosity modifier at 3 to 15 wt %, or 5 to 13 wt %, or 6 to 10 wt % of the lubricant composition. In one particularly advantageous form, the lubricant compositions disclosed herein include 6 to 7 wt % of an olefin copolymer viscosity modifier.

Additive Package

The lubricant compositions disclosed herein may also include an additive package including a combination of antioxidants, dispersants, detergents and antiwear agents. Further details on these additives are included below. The additive package may be included in the lubricant compositions at from 2 to 30 wt. %, 10 to 25 wt %, or 13 to 23 wt %, or 15 to 20 wt % of the lubricant composition. In one particularly advantageous form, the additive package is included at 17 wt % of the lubricant composition. One non-limiting exemplary additive package that includes the above combination of additives is supplied by Infineum and is designated Infineum D3426.

Second Base Stock

In addition to the first base stock and the PAO-PAG block copolymer component, the lubricant compositions disclosed herein may include a second base stock selected from a metallocene poly-α-olefin, a poly-α-olefin, a GTL base stock, and a Group III base stock. The second base stock may be included in the lubricant composition at from 5 to 45 wt %, or 10 to 40 wt %, or 15 to 35 wt %, or 20 to 30 wt %.

Other Additives i. Antioxidants

Typical antioxidants include phenolic anti-oxidants, aminic anti-oxidants and oil-soluble copper complexes.

The phenolic antioxidants include sulfurized and non-sulfurized phenolic antioxidants. The terms "phenolic type" or "phenolic antioxidant" used herein includes compounds having one or more than one hydroxyl group bound to an aromatic ring which may itself be mononuclear, e.g., benzyl, or poly-nuclear, e.g., naphthyl and Spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such bi-phenol compounds linked by alkylene bridges sulfuric bridges or oxygen bridges. Alkyl phenols include mono- and poly-alkyl or alkenyl phenols, the alkyl or alkenyl group containing from 3-100 carbons, preferably 4 to 50 carbons and sulfurized derivatives thereof, the number of alkyl or alkenyl groups present in the aromatic ring ranging from 1 to up to the available unsatisfied valences of the aromatic ring remaining after counting the number of hydroxyl groups bound to the aromatic ring.

Generally, therefore, the phenolic anti-oxidant may be represented by the general formula:

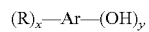

where Ar is selected from the group consisting of:

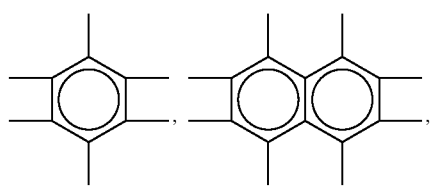

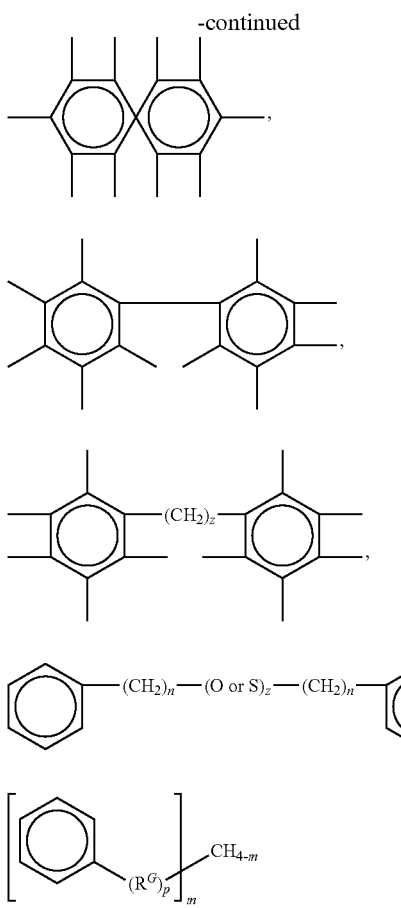

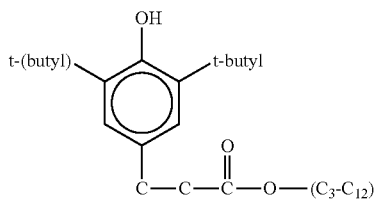

Phenolic type anti-oxidants are well known in the lubricating industry and commercial examples such as Ethanox® 4710, Irganox® 1076, Irganox® L1035, Irganox® 1010, Irganox® L109, Irganox® L118, Irganox® L135 and the like are familiar to those skilled in the art. The above is presented only by way of exemplification, not limitation on the type of phenolic anti-oxidants which can be used.

The phenolic anti-oxidant can be employed in an amount in the range of 0.1 to 3 wt %, preferably 0.25 to 2.5 wt %, more preferably 0.5 to 2 wt % on an active ingredient basis.

Aromatic amine anti-oxidants include phenyl-α-naphthyl amine which is described by the following molecular structure:

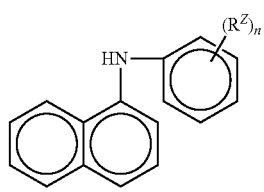

wherein $R^z$ is hydrogen or a $C_1$ to $C_{14}$ linear or $C_3$ to $C_{14}$ branched alkyl group, preferably $C_1$ to $C_{10}$ linear or $C_3$ to $C_{10}$ branched alkyl group, more preferably linear or branched $C_6$ to $C_8$ and n is an integer ranging from 1 to 5 preferably 1. A particular example is Irganox L06.

Other aromatic amine anti-oxidants include other alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, and preferably contains from 6 to 12 carbon atoms, The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines anti-oxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of such other additional amine anti-oxidants which may be present include diphenylamines, phenothiazines, imidodibenzyls and diphenyl phenylene diamines. Mixtures of two or more of such other additional aromatic amities may also be present. Polymeric amine anti-oxidants can also be used.

Another class of anti-oxidant used in lubricating oil compositions and which may also be present are oil-soluble copper compounds. Any oil-soluble suitable copper compound wherein R is a $C_3$-$C_{100}$ alkyl or alkenyl group, a sulfur substituted alkyl or alkenyl group, preferably a $C_4$-$C_{50}$ alkyl or alkenyl group or sulfur substituted alkyl or alkenyl group, more preferably $C_3$-$C_{100}$ alkyl or sulfur substituted alkyl group, most preferably a $C_4$-$C_{50}$ alkyl group, $R^g$ is a $C_1$-$C_{100}$ alkylene or sulfur substituted alkylene group, preferably a $C_2$-$C_{-50}$ alkylene or sulfur substituted alkylene group, more preferably a $C_2$-$C_2$ alkylene or sulfur substituted alkylene group, y is at least 1 to up to the available valences of Ar, x ranges from 0 to up to the available valances of Ar-y, z ranges from 1 to 10, n ranges from 0 to 20, and m is 0 to 4 and p is 0 or 1, preferably y ranges from 1 to 3, x ranges from 0 to 3, z ranges from 1 to 4 and n ranges from 0 to 5, and p is 0.

Preferred phenolic anti-oxidant compounds are the hindered phenolics and phenolic esters which contain a sterically hindered hydroxyl group, and these include those derivatives of dihydroxy aryl compounds in which the hydroxyl groups are in the o- or p-position to each other. Typical phenolic anti-oxidants include the hindered phenols substituted with $C_1+$ alkyl groups and the alkylene coupled derivatives of these hindered phenols. Examples of phenolic materials of this type 24-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4 alkoxy phenol; and may be blended into the lubricating oil. Examples of suitable copper antioxidants include copper dihydrocarbyl thio- or dithiophosphates and copper salts of carboxylic acid (naturally occurring or synthetic). Other suitable copper salts include copper dithiacarbamates, sulphonates, phenates, and acetylacetonates. Basic, neutral, or acidic copper Cu(I) and or Cu(II) salts derived from alkenyl succinic acids or anhydrides are known to be particularly useful.

Such anti-oxidants may be used individually or as mixtures of one or more types of anti-oxidants, the total amount employed being an amount of 0.20 to 6 wt %, or 0.50 to 5 wt %, or 0.75 to 3 wt % (on an as-received basis). Mixed ashless antioxidants are often preferred, including those chosen from aminic antioxidants and hindered phenolic antioxidants.

ii. Detergents

In addition to the alkali or alkaline earth metal salicylate detergent which is an optional component in the present disclosure, other detergents may also be present. While such other detergents can be present, it is preferred that the amount employed be such as to not interfere with the synergistic effect attributable to the presence of the salicylate. Therefore, most preferably such other detergents are not employed.

If such additional detergents are present, they can include alkali and alkaline earth metal phenates, sulfonates, carboxylates, phosphonates and mixtures thereof. These supplemental detergents can have total base number (TBN) ranging from neutral to highly overbased, i.e. TBN of 0 to over 500, preferably 2 to 400, more preferably 5 to 300, and they can be present either individually or in combination with each other in an amount in the range of from 0 to 10 wt %, preferably 0.5 to 5 wt % (active ingredient) based on the total weight of the formulated lubricating oil.

Such additional other detergents include by way of example and not limitation calcium phenates, calcium sulfonates, magnesium phenates, magnesium sulfonates and other related components (including borated detergents).

Another optional component of the present lubricant compositions is one or more neutral/low TBN or mixture of neutral/low TBN and overbased/high TBN alkali or alkaline earth metal alkylsalicylate, sulfonate and/or phenate detergent preferably neutral/low TBN alkali or alkaline earth metal salicylate and at least one overbased/high TBN alkali or alkalene earth metal salicylate or phenate, and optionally one or more additional neutral and/or overbased alkali or alkaline earth metal alkyl sulfonate, alkyl phenolate or alkylsalicylate detergent, the detergent or detergent mixture being employed in the lubricant composition in an amount sufficient to achieve a sulfated ash content for the finished lubricant of 0.1 mass % to 2.0 mass %, preferably 0.1 to 1.5 mass %, more preferably 0.1 to 1.0 mass %, most preferably 0.1 to 0.7 mass %.

The TBN of the neutral/low TBN alkali or alkaline earth metal alkyl salicylate, alkyl phenate or alkyl sulfonate is 150 or less mg KOH/g of detergent, preferably 120 or less mg KOH/g, most preferably 100 or less mg KOH/g while the TBN of the overbased/high TBN alkali or alkaline earth metal alkyl salicylate, alkyl phenate or alkyl sultanate is 160 or more mg KOH/g, preferably 190 or more mg KOH/g, most preferably 250 or more mg KOH/g, TBN being measured by ASTM D-2896.

The mixture of detergents may be added to the lubricant composition in an amount up to 10 vol % based on active ingredient in the detergent mixture, preferably in an amount up to 8 vol % based on active ingredient, more preferably up to 6 vol % based on active ingredient in the detergent mixture, most preferably between 1.5 to 5.0 vol %, based on active ingredient in the detergent mixture.

By active ingredient is meant the amount of additive actually constituting the name detergent or detergent mixture chemicals in the formulation as received from the additive supplier, less any diluent oil included in the material. Additives are typically supplied by the manufacturer dissolved, suspended in or mixed with diluent oil, usually a light oil, in order to provide the additive in the more convenient liquid form. The active ingredient in the mixture is the amount of actual desired chemical in the material less the diluent oil.

iii. Dispersants

During engine operation, oil-insoluble oxidation byproducts are produced. Dispersants help keep these byproducts in solution, thus diminishing their deposition on metal surfaces. Dispersants may be ashless or ash-forming in nature. Preferably, the dispersant is ashless. So called ashless dispersants are organic materials that form substantially no ash upon combustion. For example, non-metal-containing or borated metal-free dispersants are considered ashless. In contrast, metal-containing detergents discussed above form ash upon combustion.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

A particularly useful class of dispersants is the alkenylsuccinic derivatives, typically produced by the reaction of a long chain substituted alkenyl succinic compound, usually a substituted succinic anhydride, with a polyhydroxy or polyamino compound. The long chain group constituting the oleophilic portion of the molecule which confers solubility in the oil, is normally a polyisobutylene group. Many examples of this type of dispersant are well known commercially and in the literature. Exemplary U.S. patents describing such dispersants are U.S. Pat. Nos. 3,172,892; 3,2145,707; 3,219,666; 3,316,177; 3,341,542; 3,444,170; 3,454,607; 3,541,012; 3,630,904; 3,632,511; 3,787,374 and 4,234,435. Other types of dispersant are described in U.S. Pat. Nos. 3,036,003; 3,200, 107; 3,254,025; 3,275,554; 3,438,757; 3,454,555; 3,565,804; 3,413,347; 3,697,574; 3,725,277; 3,725,480; 3,726,882; 4,454,059; 3,329,658; 3,449,250; 3,519,565; 3,666,730; 3,687,849; 3,702,300; 4,100,082; 5,705,458. A further description of dispersants may be found, for example, in European Patent Application No. 471 071, to which reference is made for this purpose.

Hydrocarbyl-substituted succinic acid compounds are popular dispersants. In particular, succinimide, succinate esters, or succinate ester amides prepared by the reaction of a hydrocarbon-substituted succinic acid compound preferably having at least 50 carbon atoms in the hydrocarbon substituent, with at least one equivalent of an alkylene amine are particularly useful.

Succinimides are formed by the condensation reaction between alkenyl succinic anhydrides and amines. Molar ratios can vary depending on the amine or polyamine. For example, the molar ratio of alkenyl succinic anhydride to TEPA can vary from 1:1 to 5:1 to form mono-succinimides, bis-succinimides, and/or mixtures of amides and imides.

Succinate esters are formed by the condensation reaction between alkenyl succinic anhydrides and alcohols or polyols. Molar ratios can vary depending on the alcohol or polyol used. For example, the condensation product of an alkenyl succinic anhydride and pentaerythritol is a useful dispersant.

Succinate ester amides are formed by condensation reaction between alkenyl succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine.

The molecular weight of the alkenyl succinic anhydrides of the polyalkenyl group will typically range between 800 and 2,500. The above products can be post-reacted with various reagents such as sulfur, oxygen, formaldehyde, carboxylic acids such as oleic acid, and boron compounds such as borate esters or highly borated dispersants and can also be treated with cyclic carbonates. The dispersants can be borated with from 0.1 to 5 moles of boron per mole of dispersant reaction product.

Mannich base dispersants are made from the reaction of alkylphenols, formaldehyde, and amines. Process aids and catalysts, such as oleic acid and sulfonic acids, can also be part of the reaction mixture. Molecular weights of the alkylphenols range from 800 to 2,500 or more.

Typical high molecular weight aliphatic acid modified Mannich condensation products can be prepared from high molecular weight alkyl-substituted hydroxyaromatics or $HN(R)_2$ group-containing reactants.

Examples of high molecular weight alkyl-substituted hydroxyaromatic compounds are polypropylphenol, polybutylphenol, and other polyalkylphenols. These polyalkylphenols can be obtained by the alkylation, in the presence of an alkylating catalyst, such as $BF_3$, of phenol with high molecular weight polypropylene, polybutylene, and other polyalkylene compounds to give alkyl substituents on the benzene ring of phenol having an average 600-100,000 molecular weight.

Examples of $HN(R)_2$ group-containing reactants are alkylene polyamines, principally polyethylene polyamines Other representative organic compounds containing at least one $HN(R)_2$ group suitable for use in the preparation of Mannich condensation products are well known and include the mono- and di-amino alkanes and their substituted analogs, e.g., ethylamine and diethanol amine; aromatic diamines, e.g., phenylene diamine, diamino naphthalenes; heterocyclic amities, e.g., morpholine, pyrrole, pyrrolidine, imidazole, imidazolidine, and piperidine; melamine and their substituted analogs.

Examples of alkylene polyamine reactants include ethylenediamine, diethylene triamine, triethylene tetraamine, tetraethylene pentaamine, pentaethylene hexamine, hexaethylene heptaamine, heptaethylene octaamine, octaethylene nonaamine, nonaethylene decamine, and decaethylene undecamine and mixture of such amines having nitrogen contents corresponding to the alkylene polyamines, in the formula $H_2N—(Z—NH—)_nH$, mentioned before, Z is a divalent ethylene and n is 1 to 10 of the foregoing formula. Corresponding propylene polyamines such as propylene diamine and di-, tri-, tetra-, pentapropylene tri-, tetra-, penta- and hexaamines are also suitable reactants. The alkylene polyamines are usually obtained by the reaction of ammonia and dihalo alkanes, such as dichloro alkanes. Thus the alkylene polyamines obtained from the reaction of 2 to 11 moles of ammonia with 1 to 10 moles of dichloroalkanes having 2 to 6 carbon atoms and the chlorines on different carbons are suitable alkylene polyamine reactants.

Aldehyde reactants useful in the preparation of the high molecular products useful in this disclosure include the aliphatic aldehydes such as formaldehyde (also as paraformaldehyde and formalin), acetaldehyde and aldol (3-hydroxybutyraldehyde). Formaldehyde or a formaldehyde-yielding reactant is preferred.

Preferred dispersants include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from 500 to 5000 or more or a mixture of such hydrocarbylene groups. Other preferred dispersants include succinic acid-esters and amides, alkylphenol-polyamine-coupled Mannich adducts, their capped derivatives, and other related components. Such additives may be used in an amount of 0.1 to 20 wt %, preferably 0.1 to 8 wt %, more preferably 1 to 6 wt % (on an as-received basis) based on the weight of the total lubricant.

iv. Pour Point Depressants

Conventional pour point depressants (also known as lube oil flow improvers) may also be present. Pour point depressant may be added to lower the minimum temperature at which the fluid will flow or can be poured. Examples of suitable pour point depressants include alkylated naphthalenes polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. Such additives may be used in amount of 0.0 to 0.5 wt %, preferably 0 to 0.3 wt %, more preferably 0.001 to 0.1 wt % on an as-received basis.

v. Corrosion Inhibitors/Metal Deactivators

Corrosion inhibitors are used to reduce the degradation of metallic parts that are in contact with the lubricating oil composition. Suitable corrosion inhibitors include aryl thiazines, alkyl substituted dimercapto thiadiazoles and mixtures thereof. Such additives may be used in an amount of 0.01 to 5 wt %, preferably 0.01 to 1.5 wt %, more preferably 0.01 to 0.2 wt %, still more preferably 0.01 to 0.1 wt % (on an as-received basis) based on the total weight of the lubricating oil composition.

vi. Seal Compatibility Additives

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride and sulfolane-type seal swell agents such as Lubrizol 730-type seal swell additives. Such additives may be used in an amount of 0.01 to 3 wt %, preferably 0.01 to 2 wt % on an as-received basis.

vii. Anti-Foam Agents

Anti-foam agents may advantageously be added to lubricant compositions. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in conventional minor amounts along with other additives such as demulsifiers; usually the amount of these additives combined is less than 1 percent, preferably 0.001 to 0.5 wt %, more preferably 0.001 to 0.2 wt %, still more preferably 0.0001 to 0.15 wt % (on an as-received basis) based on the total weight of the lubricating oil composition.

Viii. Inhibitors And Anti-Rust Additives

Anti-rust additives (or corrosion inhibitors) are additives that protect lubricated metal surfaces against chemical attack by water or other contaminants. One type of anti-rust additive is a polar compound that wets the metal surface preferentially, protecting it with a film of oil. Another type of anti-rust additive absorbs water by incorporating it in a water-in-oil emulsion so that only the oil touches the surface. Yet another type of anti-rust additive chemically adheres to the metal to produce a non-reactive surface. Examples of suitable additives include zinc dithiophosphates, metal phenolates, basic metal sulfonates, fatty acids and amines Such additives may be used in an amount of 0.01 to 5 wt %, preferably 0.01 to 1.5 wt % on an as-received basis.

ix. Antiwear Agents

Antiwear agents or additives may also be included in the present disclosure. Non-limiting exemplary antiwear agents include ZDDP, zinc dithiocarbamates, molybdenum dialkyldithiophosphates, molybdenum dithiocarbamates, other organo molybdenum-nitrogen complexes, sulfurized olefins, etc.

A metal alkylthiophosphate and more particularly a metal dialkyl dithio phosphate in which the metal constituent is zinc, or zinc dialkyl dithio phosphate (ZDDP) may be present in the lubricating oils of the present disclosure. ZDDP can be primary, secondary or mixtures thereof. ZDDP compounds generally are of the formula $Zn[SP(S)(OR^1)(OR^1)(OR_2)]_2$ where $R^1$ and $R^2$ are $C_1$-$C_{18}$ alkyl groups, preferably $C_2$-$C_{12}$ alkyl groups. These alkyl groups may be straight chain or branched and can be derived from primary alcohols, secondary alcohols and mixtures thereof.

Preferable zinc dithiophosphates which are commercially available include secondary zinc dithiophosphates such as those available from for example, the Lubrizol Corporation under the trade designations "LZ 677A", "LZ 1095" and "LZ 1371", from for example Chevron Oronite under the trade designation "OLOA 262" and from for example Afton Chemical under the trade designation "HITEC 7169".

The ZDDP is typically used in amounts of from 0.4 wt % to 1.2 wt %, preferably from 0.5 wt % to 1.0 wt %, and more preferably from 0.6 wt % to 0.8 wt %, based on the total weight of the lubricating oil, although more or less can often be used advantageously. Preferably, the ZDDP is a secondary ZDDP and present in an amount of from 0.6 to 1.0 wt % of the total weight of the lubricating oil.

The term "organo molybdenum-nitrogen complexes" embraces the organo molybdenum-nitrogen complexes described in U.S. Pat. No. 4,889,647. The complexes are reaction products of a fatty oil, dithanolamine and a molybdenum source. Specific chemical structures have not been assigned to the complexes. U.S. Pat. No. 4,889,647 reports an infrared spectrum for a typical reaction product of that disclosure; the spectrum identifies an ester carbonyl band at 1740 $cm^{-1}$ and an amide carbonyl band at 1620 $cm^{-1}$. The fatty oils are glyceryl esters of higher fatty acids containing at least 12 carbon atoms up to 22 carbon atoms or more. The molybdenum source is an oxygen-containing compound such as ammonium molybdates, molybdenum oxides and mixtures.

Other organo molybdenum complexes which can be used in the present disclosure are tri-nuclear molybdenum-sulfur compounds described in EP 1 040 115 and WO 99/31113 and the molybdenum complexes described in U.S. Pat. No. 4,978,464.

x. Friction Modifiers

A friction modifier is any material or materials that can alter the coefficient of friction of a surface lubricated by any lubricant or fluid containing such material(s). Friction modifiers, also known as friction reducers, or lubricity agents or oiliness agents, and other such agents that change the ability of base oils, formulated lubricant compositions, or functional fluids, to modify the coefficient of friction of a lubricated surface may be effectively used in combination with the base oils or lubricant compositions of the present disclosure if desired. Friction modifiers that lower the coefficient of friction are particularly advantageous in combination with the base oils and lube compositions of this disclosure. Friction modifiers may include metal-containing compounds or materials as well as ashless compounds or materials, or mixtures thereof. Metal-containing friction modifiers may include metal salts or metalligand complexes where the metals may include alkali, alkaline earth, or transition group metals. Such metal-containing friction modifiers may also have low-ash characteristics. Transition metals may include Mo, Sb, Sn, Fe, Cu, Zn, and others. Ligands may include hydrocarbyl derivative of alcohols, polyols, glycerols, partial ester glycerols, thiols, carboxylates, carbamates, thiocarbamates, dithiocarbamates, phosphates, thiophosphates, dithiophosphates, amides, imides, amines, thiazoles, thiadiazoles, dithiazoles, diazoles, triazoles, and other polar molecular functional groups containing effective amounts of O, N, S, or P, individually or in combination. In particular, Mo-containing compounds can be particularly effective such as for example Mo-dithiocarbamates, Mo(DTC), Mo-dithiophosphates, Mo(DTP), Mo-amines, Mo (Am), Mo-alcoholates, Mo-alcohol-amides, etc. See U.S. Pat. Nos. 5,824,627, 6,232,276, 6,153,564, 6,143;701, 6,110,878, 5,837,657, 6,010,987, 5,906,968, 6,734,150, 6,730,638, 6,689,725, 6,569,820; WO 99/66013; WO 99/47629; and WO 98/26030.

Ashless friction modifiers may also include lubricant materials that contain effective amounts of polar groups, for example, hydroxyl-containing hydrocarbyl base oils, glycerides, partial glycerides, glyceride derivatives, and the like. Polar groups in friction modifiers may include hydrocarbyl groups containing effective amounts of O, N, S, or P, individually or in combination. Other friction modifiers that may be particularly effective include, for example, salts (both ash-containing and ashless derivatives) of fatty acids, fatty alcohols, fatty amides, fatty esters, hydroxyl-containing carboxylates, and comparable synthetic long-chain hydrocarbyl acids, alcohols, amides, esters, hydroxy carboxylates, and the like. In some instances fatty organic acids, fatty amines, and sulfurized fatty acids may be used as suitable friction modifiers.

Useful concentrations of friction modifiers may range from 0.01 weight percent to 10-15 weight percent or more, often with a preferred range of 0.1 weight percent to 5 weight percent. Concentrations of molybdenum-containing materials are often described in terms of Mo metal concentration. Advantageous concentrations of Mo may range from 10 ppm to 3000 ppm or more, and often with a preferred range of 20-2000 ppm, and in some instances a more preferred range of 30-1000 ppm. Friction modifiers of all types may be used alone or in mixtures with the materials of this disclosure. Often mixtures of two or more friction modifiers, or mixtures of friction modifier(s) with alternate surface active material(s), are also desirable.

Lubricant Composition Properties

The lubricant compositions including the PAO-PAG block copolymer fluid described above provide improved oxidative stability, wear resistance properties and frictional properties in engine oil lubrication applications.

In terms of oxidative stability as measured by bench oxidation test at 167 hours (described in detail below), the lubricant compositions disclosed herein yield a kinematic viscosity at 40° C. of less than or equal to 400 cSt, or less than or equal to 390 cSt, or less than or equal to 380 cSt, or less than or equal to 370 cSt, or less than or equal to 360 cSt, or less than or equal to 350 cSt, or less than or equal to 345 cSt, or less than or equal to 340 cSt, or equal to 339 cSt.

In terms of wear resistance as measured by wear scar using a High Frequency Reciprocating Rig (HFRR) test (described in detail below), the lubricant compositions disclosed herein yield a wear scar value of less than or equal to 170 microns, or less than or equal to 165 microns, or less than or equal to 160 microns, or less than or equal to 155 microns, or less than or equal to 150 microns, or less than or equal to 145 microns, or equal to 144 microns.

In terms of frictional properties as measured by the average friction coefficient at 70° C. using a High Frequency Reciprocating Rig (HFRR) test (described in detail below), the lubricant compositions disclosed herein yield an average friction coefficient of less than or equal to 0.165, or less than or equal to 0.160, or less than or equal to 0.155, or less than or equal to 0.151, or less than or equal to 0.11. These frictional properties are unexpected because the lubricant compositions including the PAO-PAG block copolymer fluid are significantly higher in kinematic viscosity than comparable lubricant compositions not including the PAO-PAG block copolymer fluid, but still yield significantly lower friction coefficient. Generally, a lubricant composition with higher kinematic viscosity yields a higher friction coefficient and vice versa.

In the above detailed description, the specific embodiments or forms of this disclosure have been described in connection with its preferred embodiments or forms. However, to the extent that the above description is specific to a particular embodiment, particular form or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

The following are examples of the present disclosure and are not to be construed as limiting.

EXAMPLES

PAO-PAG block copolymer fluids were synthesized via processes according to the present disclosure.

Example 1

The Synthesis of Polyether-Containing Epoxy-Amine Polymer From Alkyl ($C_8$-$C_{10}$) Glycidyl Ether And Jeffamine® D-230

A mixture of octyl/decyl glycidyl ether (31.35 g, 0.125 mol), Jeffamine® D-230 (6.00 grams, 0.026 mol) and absolute ethanol (60 ml) was heated in a 500 ml round-bottomed flask at reflux for 30 hours. The yellow solution was cooled to room temperature, concentrated on a rotary evaporator followed by heating in an air bath oven at 160° C. to 170° C. under vacuum to remove excess octyl/decyl glycidyl ether. The yield of yellow oil product was 25.5 grams (95%). The product IR and NMR analysis suggests the formation of tetra amino alcohol of octyl/decyl glycidyl ether and Jeffamine® D-230. $^1$H NMR δ (CDCl$_3$) 0.87 (CH$_3$, t), 1.12 (br), 1.26 (CH$_2$, m), 2.60-2.80 (CH$_2$, m) 3.36-3.68 (—CH$_2$—O, CH—O, m).

Lube Properties of Base Stock

The kinematic viscosity (Kv) of the liquid product was measured using ASTM standard D-445 and reported at temperatures of 100° C. (Kv at 100° C.) or 40° C. (Kv at 40° C.). The viscosity index (VI) was measured according to ASTM standard D-2270 using the measured kinematic viscosities for each product. The viscosity of the product at 100° C. was 14.23 cSt, and 149.96 cSt at 40° C. with a viscosity index (VI) of 91. The pour point of the product was −39° C. The data were compared with PAO 10 as a control. The viscometric data of the product suggest that the fluid has excellent lubricant properties that are comparable to PAO. Results are set forth in Table 1 below. PAO 10 is ExxonMobil Chemical SpectraSyn™ Polyalphaolefin (PAO).

TABLE 1

(Lube Properties of Base Stocks of Example 1 and Control)

| Sample # | $Kv_{100}$ | $Kv_{40}$ | Viscosity Index (VI) | Pour Point (° C.) |
|---|---|---|---|---|
| Example 1 | 14.23 | 149.96 | 91 | −39 |
| PAO10 | 10 | 66 | 137 | −48 |

Friction Coefficients of Base Stock

Lubricant fuel/energy efficiency has been identified as a critical feature for premium lubricants. In order to provide step-out fuel economy while maintaining or improving other performance features for lubricants, base stocks with lower friction coefficients are needed. The friction coefficient of the product base stock was measured using the HFRR (high frequency reciprocating rig) test. The friction coefficient of the product was 0.1, while the friction coefficient of 10 cSt PAO under same measurement conditions was 0.13. This difference in friction coefficient reflects the energy efficiency of the base stock. Results are set forth in Table 2 below. Even though Example 1 had a higher $Kv_{100}$ and $Kv_{40}$ compared to PAO10 in Table 1, it yielded significantly lower friction coefficient than PAO10, which is unexpected and surprising.

TABLE 2

(The Friction Coefficients of Base Stocks of Example 1 and Control)

| Sample # | Friction Coefficient (FC) |
|---|---|
| Example 1 | 0.10 |
| PAO 10 | 0.13 |

Blending Studies

Example 2

The Blending Studies of Jeffamine® (D-230)-Glycidyl Ether ($C_8$-$C_{10}$) of Example 1 With PAO4 And Control

TABLE 3

(Blending Studies of the Product of Example 1 and PAO4 Base Stock)

| | Product Example 1 | Product Ex. 1: PAO4 | Product Ex. 1: PAO4 | Product Ex. 1: PAO4 | Product Ex. 1: PAO4 | PAO4 |
|---|---|---|---|---|---|---|
| Blend Composition | 100 | 50 | 20 | 10 | 5 | 100 |
| Kv100 cSt | 14.23 | 6.07 | 4.84 | 4.43 | 4.26 | 4.1 |
| Kv40 cSt | 149.96 | 35.67 | 24.51 | 20.81 | 19.61 | 19 |
| VI | 91 | 116 | 12.1 | 125 | 125 | 126 |
| PP (° C.) | −39 | | | | | −66 |
| Avg FC | 0.098 | 0.122 | 0.122 | 0.126 | 0.127 | 0.21 |

Example 3

Synthesis of Polyether-Containing Epoxy-Amine Polymer From Dodecyl/Tetradecyl Glycidyl Ether And Jeffamine® D-230

Dodecyl/tetradecyl glycidyl ether (61.5 grams, 0.205 mol) and Jeffamine® D-230 (11.5 grams, 0.05 mol) were charged to a 500 ml round-bottom flask with 50 ml of ethanol. The reaction mixture refluxed overnight with stirring. After cooling, the low boiling ethanol was removed with a rotary evaporator and the high boiling excess of dodecyl/tetradecyl glycidyl ether was removed with an air bath oven at 160° C. to 170° C. under vacuum. The final colorless product yield was 70 grams (96%). The product IR and NMR analysis suggest the formation of a tetra amino alcohol of dodecyl/tetradecyl glycidyl ether and Jeffamine® D-230. IR: $(cm^{-1})$ 3463, 2922, 1458, 1369, 1115, 720 NMR: $^1$NMR δ $(CDCl_3)$ 0.874 $(CH_3, s)$, 0.976 $(CH_3, s)$ 1.265 $(—CH_2—, m)$, 2.587 $(CH_2, s)$ 3.439-3,592 $(—CH_2—O, CH—O, m)$, 3.79 (OH, s).

Lube Properties of Base Stock

The viscosity of the product at 100° C. was 17.7 cSt and at 40° C. was 181.6 cSt with a viscosity index (VI) of 106. The pour point of the product was −6°C. The data was compared with PAO 10 (control) and are set forth in Table 4 below. The viscometric data of the product suggests that the fluid has good lubricant properties that are comparable to PAO.

TABLE 4

(Lube Properties of Base Stocks of Example 3 and Control)

| Sample # | $Kv_{100}$ | $Kv_{40}$ | Viscosity Index (VI) | Pour Point (° C.) |
|---|---|---|---|---|
| Example 3 | 17.7 | 181.6 | 106 | −6 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.068, while the friction coefficient of the 10 cSt PAO under same measurement conditions was 0.13 (see Table 5 below). This difference in friction coefficient reflects the energy efficiency of the base stock. Even though Example 3 had a higher $Kv_{100}$ and $Kv_{40}$ compared to PAO10 in Table 4, it yielded significantly lower friction coefficient than PAO10, which is unexpected and surprising.

TABLE 5

(Friction Coefficient of Base Stocks of Example 3 and Control)

| Example # | Friction Coefficient (FC) |
|---|---|
| Example 3 | 0.068 |
| PAO 10 | 0.13 |

Example 4

Blending Studies of Jeffamine® (D-230)-Glycidyl Ether $(C_{12}-C_{14})$ of Example 3 With PAO4

TABLE 6

(Blending Studies of the Product of Example 3 with PAO4 Base Stock)

| | Product Example 3 | Product Ex. 3: PAO4 | Product Ex. 3: PAO4 | Product Ex. 3: PAO4 | PAO4 |
|---|---|---|---|---|---|
| Blend Composition | 100 | 50 | 10 | 5 | 100 |
| Kv100 cSt | 17.7 | 7.8 | 4.6 | 4.3 | 4.1 |
| Kv40 cSt | 181.6 | 49.4 | 21.5 | 19.7 | 19 |
| VI | 106 | 126 | 133 | 129 | 126 |

Polyether-Containing Epoxy-Amine Polymer From Alkyl $(C_8-C_{10})$ Glycidyl Ether And Jeffamines®

Example 5

Synthesis of Polyether-Containing Epoxy-Amine Polymer From $C_8/C_{10}$ Glycidyl Ether And Polytetrahydrofurane Bis (3-Aminopropyl) Terminated

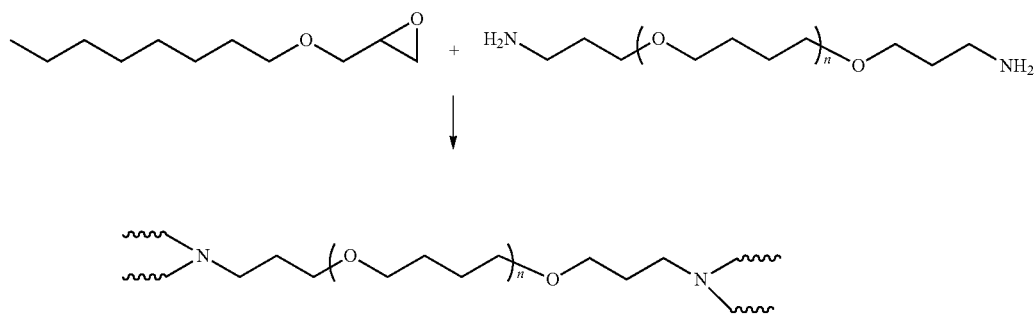

Octyl/decyl glycidyl ether (41 grams, 0.1025 mol) and polytetrahydrofurane bis (3-aminopropyl) terminated (mw~350, 8.75 grams, 0.025mol) were charged in a 300 ml round bottom flask with 25 ml of ethanol. The reaction mixture was refluxed overnight with stirring. After cooling, the low boiling ethanol was removed with a rotary evaporator and the high boiling excess of ocyl/decyl glycidyl ether was removed with an air bath oven at 180° C. under vacuum. The final colorless product yield was 38 grams (79%). The product IR analysis suggests the formation of a tetra amino alcohol of octyl/decyl glycidyl ether and polytetrahydrofurane bis (3-aminopropyl) terminated. IR: (cm$^{-1}$) 3429, 2925, 2855, 1465, 1376, 1252, 1113, 847, 746, 722.

Lube Properties of Base Stock

The viscosity of the product at 100° C. was 16 cSt and at 40° C. was 140 cSt with a viscosity index (VI) of 121. The pour point of the product was −39° C. The data was compared with PAO 10 as a control. The viscometric data of the product suggest that the fluid has excellent lubricant properties that are comparable to PAO. Results are set forth in Table 7 below.

TABLE 7

(Lube Properties of Base Stocks of Example 5 and Control)

| Sample # | $Kv_{100}$ | $Kv_{40}$ | Viscosity Index (VI) | Pour Point (° C.) |
|---|---|---|---|---|
| Example 5 | 16 | 140 | 121 | −39 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.044, while the friction coefficient of the 10 cSt PAO (control) under same measurement conditions was 0.13. This substantially difference in friction coefficient reflects the energy efficiency of the base stock. The results are set forth below in Table 8. Even though Example 5 had a higher $Kv_{100}$ and $Kv_{40}$ compared to PAO 10 in Table 7, it yielded significantly lower friction coefficient than PAO10, which is unexpected and surprising.

TABLE 8

(Friction Coefficient of Base Stocks of Example 5 and Control)

| Sample # | Friction Coefficient (FC) |
|---|---|
| Example 5 | 0.044 |
| PAO 10 | 0.13 |

Example 6

Synthesis of Polyether-Containing Epoxy-Amine Polymer From $C_8/C_{10}$ Glycidyl Ether And Poly (Propylene Glycol)-Block-Poly(Ethylene Glycol)-Block-Poly(Propylene Glycol) Bis(2-Aminopropyl Ether) (Jeffamine® D-600)

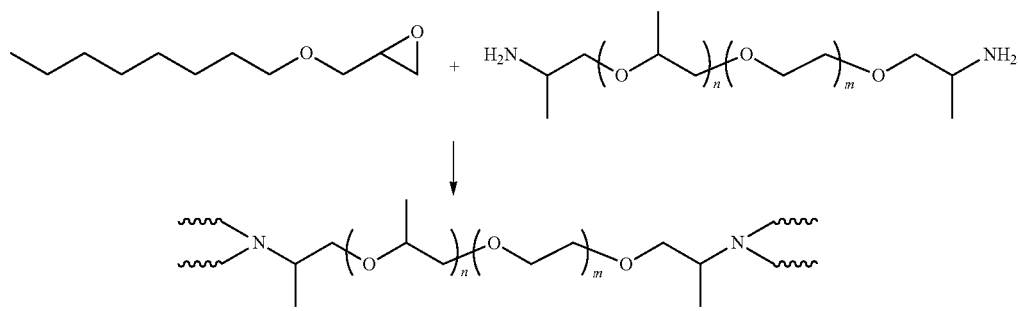

Octyl/decyl glycidyl ether (68 grams, 0.190 mol) and Jeffamine® D-600 (25 grams, 0.042 mol) were charged in a 500 ml round bottom flask with 50 ml of ethanol. The reaction mixture was refluxed overnight with stirring. After cooling, the low boiling ethanol was removed with a rotary evaporator and the high boiling excess Of ocyl/decyl glycidyl ether with an air bath oven was removed at 200° C. under vacuum. The final product was colorless, and the product yield was 64 grams (69%). The product IR analysis suggests the formation of a tetra amino alcohol of ocyl/decyl glycidyl ether and Jeffamine® D-600. IR: (cm$^{-1}$) 3444, 2922, 2847, 1463, 1369, 1345, 1247, 1296, 993, 945, 743, 724.

Lube Properties of Base Stock

The viscosity of the product at 100° C. was 23.9 cSt and at 40° C. was 209.2 cSt with a viscosity index (VI) of 142. The pour point of the product was −42° C. The data were compared with that of PAO 10 in Table 9 below. The viscometric data of the product suggest that the fluid has excellent lubricant properties that are comparable to PAO.

TABLE 9

(Lube Properties of Base Stocks in Example 6 and Control)

| Sample # | $Kv_{100}$ | $Kv_{40}$ | Viscosity Index (VI) | Pour Point (° C.) |
|---|---|---|---|---|
| Example 6 | 23.9 | 209.2 | 142 | −42 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.073, while the friction coefficient of 10 cSt PAO under same measurement conditions was 0.13 (see Table 10 below). This substantially difference in friction coefficient reflects the energy efficiency of the base stock. Even though Example 6 had a higher $Kv_{100}$ and $Kv_{40}$ compared to PAO10 in Table 9, it yielded significantly lower friction coefficient than PAO10, which is unexpected and surprising.

TABLE 10

(Friction Coefficient of Base Stocks in Example 6 and Control)

| Sample # | Friction Coefficient (FC) |
|---|---|
| Example 6 | 0.073 |
| PAO 10 | 0.13 |

Example 7

Synthesis of Polyether-Containing Epoxy-Amine Polymer From Octyl/Decyl Glycidyl Ether And Jeffamine® D-230

Octyl/decyl glycidyl ether (246 grams, 1.230 mol) and Jeffamine® D-230 (69 grams, 0.3 mol) were charged in 500 ml round bottom flash with 150 ml ethanol. The reaction mixture was refluxed overnight with stirring. After cooling, the low boiling ethanol was removed with a rotary evaporator at 85° C. and the high boiling excess of octyl/decyl glycidyl ether was removed with an air bath oven at 180° C. under 1 mm vacuum. The final light yellow product yielded 300 grams (~97%). The product IR analysis suggests the formation of tetra amino alcohol of octyl/decyl glycidyl ether and Jeffamine® D-230. IR: ($cm^{-1}$) 3432, 2926, 2855, 1465, 1376, 1342, 1272, 1116, 722.

Lube Properties of Base Stock

The kinematic viscosity (Kv) of the liquid product was measured using ASTM D-445. The viscosity of the product at 100° C. was 18.8 cSt and at 40° C. was 250 cSt with a viscosity index (VI) of 82. The pour point of the product was −36° C. The data were compared with PAO 10 as a control and the results set forth in Table 11 below. The viscometric data of the product suggest that the fluid has excellent lubricant properties that are comparable to PAO.

TABLE 11

(Properties of Base Stocks of Example 7 and Control)

| Sample # | $Kv_{100}$ | $Kv_{40}$ | Viscosity Index (VI) | Pour Point (° C.) |
|---|---|---|---|---|
| Example 7 | 18.8 | 250 | 82 | −36 |
| PAO10 | 10 | 66 | 137 | −48 |

Friction Coefficients of Base Stock

The friction coefficient of the product base stock was measured using a HFRR test. The friction coefficient of the product was 0.11, while the friction coefficient of 10 cSt PAO under same measurement conditions was 0.13. This substantially difference in friction coefficient reflects the energy efficiency of the base stock. Results are set forth below in Table 12. Even though Example 7 had a higher $Kv_{100}$ and $Kv_{40}$ compared to PAO10 in Table 11, it yielded significantly lower friction coefficient than PAO 10, which is unexpected and surprising.

TABLE 12

(The Friction Coefficient of Base Stocks of Example 7 and Control)

| Sample # | Friction Coefficient (FC) |
|---|---|
| Example 7 (25872-006) | 0.11 |
| PAO 10 | 0.13 |

Example 8

Synthesis of Polyether-Containing Epoxy-Amine Polymer From Octyl/Decyl Glycidyl Ether And Jeffamine® D-230

Octyl/decyl glycidyl ether (267.4 grams, 1.337 mol) and Jeffamine® D-230 (75 grams, 0.326 mol) were charged in a 500 ml round bottom flash with 150 ml ethanol. The reaction mixture was refluxed overnight with stirring. After cooling, the low boiling ethanol was removed with a rotary evaporator at 85° C. and the high boiling excess of octyl/decyl glycidyl ether was removed with an air bath oven at 180° C. under a 1 mm vacuum. The final light yellow product yielded 335 grams (100%). The product IR analysis suggests the formation of a tetra amino alcohol of octyl/decyl glycidyl ether and Jeffamine® D-230. IR: ($cm^{-1}$) 3431, 2926, 2856, 1465, 1375, 1341, 1271, 1116, 865, 722.

Lube Properties of Base Stock

The kinematic viscosity (Kv) of the liquid product was measured using ASTM D-445. The viscosity of the product at 100° C. was 20.1 cSt and at 40° C. was 276 cSt with a viscosity index (VI) of 82. The data was compared with PAO 10 as a control and the results set forth in Table 13. The viscometric data of the product suggest that the fluid has good lubricant properties that are comparable to PAO.

TABLE 13

(Properties of Base Stocks of Example 8 and Control)

| Sample # | $Kv_{100}$ | $Kv_{40}$ | Viscosity Index (VI) | Pour Point (° C.) |
|---|---|---|---|---|
| Example 8 | 20.1 | 276 | 82 | −48 |
| PAO10 | 10 | 66 | 137 | −48 |

Friction Coefficients of Base Stock

The friction coefficient of the product base stock was measured using a HFRR test. The friction coefficient of the product was 0.11 while the friction coefficient of 10 cSt PAO under same measurement conditions was 0.13, the friction coefficient of 10 cSt PAO under same measurement conditions was 0.13 (see Table 14), This substantial difference in friction coefficient reflects the energy efficiency of the base stock. Even though Example 8 had a higher $Kv_{100}$ and $Kv_{40}$ compared to PAO10 in Table 13, it yielded significantly lower friction coefficient than PAO10, which is unexpected and surprising.

TABLE 14

(The Friction Coefficient of Base Stocks of Example 8 and Control)

| Sample # | Friction Coefficient (FC) |
|---|---|
| Example 8 (25872-013) | 0.11 |
| PAO 10 | 0.13 |

Example 9

The Synthesis of Polyether-Containing Epoxy-Amine Polymer From $C_{20}$-Epoxy And Jeffamine® D-400

$C_{20}$-epoxy (11.84 grams, 0.04 mol) and Jeffamine® D-400 (4.0 grams, 0.01 mol) were charged in a 200 ml round-bottomed flask with 40 mL of ethanol. The reaction mixture was refluxed overnight with stirring. After cooling, the low boiling ethanol was removed with a rotary evaporator and the high boiling unreacted $C_{20}$-epoxy was removed with an air bath oven at 160° C. to 170° C. under vacuum. The final yellow product yield was 5.92 grams (37%). The product IR, NMR and MS analysis suggests the formation of mono- and di-amino alcohol of $C_{20}$-epoxy and Jeffamine® D-400. IR: ($cm^{-1}$) 3458, 3360, 2927, 2837, 1468, 1374, 1110, 898, 720 NMR: ($^1H$ δCDCl$_3$) 0.888 (CH3, s), 1.014 (CH$_3$, s), 1.264 (—CH$_2$—, m), 2.51-2.90 (CH$_2$, s), 3.492 (—CH$_2$—O, CH—O), 1.99 (NH s) MS: (m/z) 1131 1015, 893, 835, 777, 719, 661.

Lube Properties of Base Stock

The kinematic viscosity (Kv) of the liquid product was measured using ASTM standard D-445 and reported at temperatures of 100° C. (Kv at 100° C.) or 40° C. (Kv at 40° C.). The viscosity index (VI) was measured according to ASTM standard D-2270 using the measured kinematic viscosities for each product. The viscosity of the product at 100° C. was 4.6 cSt and at 40° C. was 22.7 cSt with a viscosity index (VI) of 120. The data suggest the lubricant properties of the product are comparable to PAO4 base stock (control). The results are set forth below in Table 15.

TABLE 15

(Lube Properties of Base Stocks in Example 9 and Control)

| Sample # | $Kv_{100}$ | $Kv_{40}$ | Viscosity Index (VI) | Pour Point (° C.) |
|---|---|---|---|---|
| Example 9 | 4.6 | 22.7 | 120 | −51 |
| PAO 4 | 4.1 | 19 | 126 | −66 |

Friction Coefficients of Base Stock

The friction coefficient of the product base stock was measured using a HFRR (high frequency reciprocating rig) test. The friction coefficient of the product was 0.11 while the friction coefficient of 4 cSt PAO (control) under same measurement conditions was 0.22. This substantially difference in friction coefficient reflects the energy efficiency of the base stock. Results are set forth below in Table 16. Even though Example 9 had a higher $Kv_{100}$ and $Kv_{40}$ compared to PAO4 in Table 15, it yielded significantly lower friction coefficient than PAO4, Which is unexpected and surprising.

TABLE 16

(Friction Coefficient of Base Stocks of Example 9 and Control)

| Sample # | Friction Coefficient (FC) |
|---|---|
| Example 9 | 0.11 |
| PAO 4 | 0.22 |

The epoxy-amine based polyether material was found to be very good base stock. The fluid was found to be soluble in other base stocks such as poly-α-olefins, Group III+ type fluids (Visom, GTL, etc) and Group I-III base stocks.

Blending Studies

The results of blending studies of the product of Example 9 and PAO4 are shown below in Example 10 and Table 17.

Example 10

Blending Studies of Example 9 With PAO4

TABLE 17

(Blending Studies of the Product of Example 9 and PAO4 Control)

| | Product Example 9 | Product Ex. 9: PAO4 | Product Ex. 9: PAO4 | Product Ex. 9: PAO4 | Product Ex. 9: PAO4 | PAO4 |
|---|---|---|---|---|---|---|
| Blend Composition | 100 | 50 | 20 | 10 | 5 | 100 |
| Kv100 cSt | 4.6 | 4.2 | 4.1 | 4.1 | 4.1 | 4.1 |
| Kv40 cSt | 22.7 | 19.6 | 18.6 | 18.4 | 18.3 | 19 |
| VI | 120 | 120 | 124 | 127 | 128 | 126 |
| PP (° C.) | −51 | | | | | −66 |

Example 11

The Synthesis of Polyether-Containing Epoxy-Amine Polymer From $C_{20}$-Epoxy and Jeffamine® D-230

A mixture of $C_{20}$-epoxy (20.00 grams, 0.067 mol), Jeffamine® D-230 (4.47 grams, 0.019 mol) and absolute ethanol (60 ml) was heated in a 250 ml round-bottomed flask at reflux for 48 hours. The yellow solution was cooled to room temperature and concentrated on a rotary evaporator followed by heating in an air bath oven at 160° C. to 170° C. under vacuum to remove high-boiling unreacted $C_{20}$-epoxy. The product was a yellow oil, and the product yield was 16.0 grams (65%).

Lube Properties of Base Stock

The viscosity of the product at 100° C. was 8.2 cSt and at 40° C. was 76.5 cSt with a viscosity index (VI) of 72. The pour point of the product was −45° C. The data suggest that the lubricant properties of the product are comparable to PAO10 base stock (control). The results are set forth below in Table 18.

TABLE 18

(Lube Properties of Example 11 and Control)

| Sample # | $Kv_{100}$ | $Kv_{40}$ | Viscosity Index (VI) | Pour Point (° C.) |
|---|---|---|---|---|
| Example 11 | 8.2 | 76.5 | 72 | −45 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.10, while the friction coefficient of a 10 cSt PAO (control) under same measurement conditions was 0.13. This difference in friction coefficient reflects the energy efficiency of the base stock. Results are set forth below in Table 19, Even though Example 11 had a higher $Kv_{40}$ compared to PAO10 in Table 18, it yielded significantly lower friction coefficient than PAO10, which is unexpected and surprising.

TABLE 19

(Friction Coefficients of Example 11 and Control)

| Sample # | Friction Coefficient (FC) |
|---|---|
| Example 11 | 0.10 |
| PAO 10 | 0.13 |

Example 12

Synthesis of Polyether-Containing Epoxy-Amine Polymer From $C_{20}$-Epoxy And Jeffamine® D-400

$C_{20}$-epoxy (65 grams, 0.22 mol) and Jeffamine® D-400 (80 grams, 1.0 mol) were charged in a 500 ml round-bottom flask with 40 ml ethanol. The reaction mixture was refluxed overnight with stirring. After cooling, the low boiling ethanol was removed with a rotary evaporator and the high boiling unreacted $C_{20}$-epoxy was removed with an air bath oven at 180° C. under a 1 mm vacuum. The final yellow product yield was 109 grams (78%). The product IR suggests the formation of an amino alcohol of a $C_{20}$-epoxy and Jeffamine® D-400. IR: $(cm^{-1})$ 3371, 2961, 2926, 2855, 1462, 1362, 1299, 1111, 921, 720.

Lube Properties of Base Stock

The viscosity of the product at 100° C. was 5.8 cSt and at 40° C. was 31.9 cSt with a viscosity index (VI) of 125. The pour point of the product was −48° C. The data suggest that the lubricant properties of the product are comparable to PAO4 base stock (control). Results are set forth below in Table 20.

TABLE 20

(Lube Properties of Base Stocks of Example 12 and Control)

| Sample # | $Kv_{100}$ | $Kv_{40}$ | Viscosity Index (VI) | Pour Point (° C.) |
|---|---|---|---|---|
| Example 12 | 5.8 | 31.9 | 125 | −48 |
| PAO4 | 4.1 | 19 | 126 | −66 |

Friction Coefficients of Base Stock

The friction coefficient of the product base stock was measured using HFRR (high frequency reciprocating rig) test. The friction coefficient of the product was 0.13 while, the friction coefficient of 4 cSt PAO under same measurement conditions was 0.21. This substantial difference in friction coefficient reflects the energy efficiency of the base stock. Results are set forth below in Table 21. Even though Example 12 had a higher $Kv_{100}$ and $Kv_{40}$ compared to PAO4 in Table 20, it yielded significantly lower friction coefficient than PAO4, which is unexpected and surprising.

TABLE 21

(The Friction Coefficient of Base Stocks of Example 12 and Control)

| Sample # | Friction Coefficient (FC) |
|---|---|
| Example 12 (25872-07) | 0.13 |
| PAO 4 | 0.21 |

Example 13

Synthesis of Polyether-Containing Epoxy-Amine Polymer From $C_{20}$-Epoxy And Jeffamine® D-400

$C_{20}$-epoxy (97.88 grams, 0.33 mol) and Jeffamine® D-400 (120 grams, 0.30 mol) were charged in a 500 ml round-bottom flask with 50 ml ethanol. The reaction mixture was refluxed overnight with stirring. After cooling, the low boiling ethanol was removed with a rotary evaporator and the high boiling unreacted $C_{20}$-epoxy was removed with an air bath oven at 180° C. under a 1 mm vacuum. The final product was yellow, and the product yield was 173 grams (83%). The product IR suggests the formation of an amino alcohol of $C_{20}$-epoxy and Jeffamine® D-400. IR: $(cm^{-1})$ 3369, 290, 2925, 2855, 1591, 1460, 1378, 1374, 1345, 1299, 1110, 1018, 922, 722

Lube Properties of Base Stock

The viscosity of the product at 100° C. was 5.4 cSt and at 40° C. was 30.2 cSt with a viscosity index (VI) of 113. The pour point of the product was −54° C. The data suggest that the lubricant properties of the product are comparable to PAO 4 base stock (control). The results are set forth below in Table 22.

TABLE 22

(Lube Properties of Base Stocks of Example 13 and Control)

| Sample # | $Kv_{100}$ | $Kv_{40}$ | Viscosity Index (VI) | Pour Point (° C.) |
|---|---|---|---|---|
| Example 13 | 5.4 | 30.2 | 113 | −54 |
| PAO4 | 4.1 | 19 | 126 | −66 |

Example 14

The Synthesis of Polyether-Containing Epoxy-Amine Polymer From Poly (Ethylene Glycol) Diglycidyl Ether And Dioctylamine A mixture of poly (ethylene glycol) diglycidyl ether (25 grams, 0.0475 mol), dioctylamine (24 grams, 0.0998 mol) and ethanol (25 ml) was heated at reflux in a 250 ml round-bottom flask for 18 hours. The solution was cooled to room temperature and concentrated on a rotary evaporator to remove the low boiling ethanol followed by heating in an air bath over at 200° C. under a 1 mm vacuum to remove excess dioctylamine. The solution was washed with 50 ml water to remove unreacted poly(ethylene glycol) diglycidyl ether. The product was of a light yellow color, and product yield was 46grams (96%). The product IR analysis suggests the formation of a tetra alkyl amino alcohol of poly (ethylene glycol) diglycidyl ether and dioctylamine. IR: $(cm^{-1})$ 3454, 2922, 2851, 1468, 1345, 1289, 1247, 1110, 1044, 941, 865, 724.

Lube Properties of Base Stock

The viscosity of the product at 100° C. was 13.3 cSt and at 40° C. was 87.4 cSt with a viscosity index (VI) of 154. The pour point of the product was −45° C. The data was compared with PAO 10 (control) and set forth in Table 23 below. Thus, the viscometric data of the product suggest that the fluid has excellent lubricant properties that are comparable to PAO. Results are set forth below in Table 23.

TABLE 23

(Lube Properties of Base Stocks of Example 14 and Control)

| Sample # | $Kv_{100}$ | $Kv_{40}$ | Viscosity Index (VI) | Pour Point (°C.) |
|---|---|---|---|---|
| Example 14 | 13.3 | 87.4 | 154 | −45 |
| PAO10 | 10 | 66 | 137 | −48 |

Friction Coefficients of Base Stock

Lubricant fuel/energy efficiency has been identified as a critical feature for future premium lubricants. To provide step-out fuel economy while maintaining or improving other performance features for lubricants, base stocks with lower friction coefficients are needed. The friction coefficient of the product base stock was measured using a HFRR (high frequency reciprocating rig) test. The friction coefficient of the product was 0.09, while the friction coefficient of a 10 cSt PAO (control) under same measurement conditions was 0.13. This substantial difference in friction coefficient reflects the energy efficiency of the base stock. Results are set forth below in Table 24. Even though Example 14 had a higher $Kv_{100}$ and $Kv_{40}$ compared to PAO10 in Table 23, it yielded significantly lower friction coefficient than PAO10, which is unexpected and surprising.

TABLE 24

(Friction Coefficient of Base Stocks of Example 14 and Control)

| Sample # | Friction Coefficient (FC) |
|---|---|
| Example 14 | 0.09 |
| PAO 10 | 0.13 |

Example 15

Synthesis of Polyether Containing Epoxy-Amine Polymer From Poly (Propylene Glycol) Diglycidyl Ether And Dioctylamine Poly (propylene glycol) diglycidyl ether (50.54 g, 0.133 mol) and dioctylamine (67.3 g, 0.279 mol) were charged in a 500 ml round-bottom flask with 25 ml ethanol. The reaction mixture was refluxed overnight with stirring. After cooling, the low boiling ethanol was removed with a rotary evaporator at 85° C. and the high boiling excess of dioctylamine was removed with an air bath oven at 185° C. under a 1 mm vacuum. The final product was a light yellow color, and the product yield was 73.4 grams (98%). The product IR analysis suggests the formation of a tetra alkyl amino alcohol of poly (propylene glycol) diglycidyl ether and dioctylamine IR: (cm$^{-1}$) 3436, 2926, 2855, 1466, 1376, 1109, 724.

Lube Properties of Base Stock

The viscosity of the product at 100° C. was 10.2 cSt and at 40° C. was 86.1 cSt with a viscosity index (VI) of 100. The pour point of the product was −45° C. The data was compared with PAO 10 (control) and set forth in Table 25 below. The viscometric data of the product suggest that the fluid has excellent lubricant properties that are comparable to PAO.

TABLE 25

(Lube Properties of Base Stocks of Example 15 and Control)

| Sample # | $Kv_{100}$ | $Kv_{40}$ | Viscosity Index (VI) | Pour Point (°C.) |
|---|---|---|---|---|
| Example 15 | 10.2 | 86.1 | 100 | −45 |
| PAO10 | 10 | 66 | 137 | −48 |

Friction Coefficients of Base Stock

The friction coefficient of the product base stock was measured using a HFRR (high frequency reciprocating rig) test. The friction coefficient of the product was 0.11, while the friction coefficient of 10 cSt PAO under the same measurement conditions was 0.13. This difference in friction coefficient reflects the energy efficiency of the base stock. Results are set forth in Table 26 below. Even though Example 15 had a higher $Kv_{100}$ and $Kv_{40}$ compared to PAO10 in Table 24, it yielded significantly lower friction coefficient than PAO10, which is unexpected and surprising.

TABLE 26

(Friction Coefficient of Base Stocks of Example 15 and Control)

| Sample # | Friction Coefficient (FC) |
|---|---|
| Example 15. | 0.11 |
| PAO 10 | 0.13 |

Example 16

Synthesis of Polyether-Containing Epoxy-Amine Polymer From Poly (Propylene Glycol) Diglycidyl Ether And Dioctylamine Poly (propylene glycol) diglycidyl ether (150 grams, (0.395 mol) and dioctylamine (200 grams, 0.829 mol) were charged in a 500 ml round-bottom flask with 200 ml ethanol. The reaction mixture was refluxed overnight with stiffing. After cooling, the low boiling ethanol was removed with a rotary evaporator at 85° C. and the high boiling excess of dioctylamine was removed with an air bath oven at 185° C. under a 1 mm vacuum. The final product was of a light yellow color, and the yield was 340 grams (99.9%). The product IR analysis suggests the formation of a tetra alkyl amino alcohol of poly (propylene glycol) diglycidyl ether and dioctylamine IR: (cm$^{-1}$) 3447, 2925, 2855, 1465, 1376, 1110, 933, 746, 722.

Lube Properties of Base Stock

The viscosity of the product at 100° C. was 10.9 cSt and at 40° C. was 87 cSt with a viscosity index (VI) of 112. The pour point of the product was −48° C. The data was compared with PAO 10 (control). The viscometric data of the product suggests that the fluid has excellent lubricant properties comparable to PAO. Results are set forth in Table 27 below.

TABLE 27

(Lube Properties of Base Stocks of Example 16 and Control)

| Sample # | $Kv_{100}$ | $Kv_{40}$ | Viscosity Index (VI) | Pour Point (°C.) |
|---|---|---|---|---|
| Example 16 | 10.9 | 87 | 112 | −48 |
| PAO10 | 10 | 66 | 137 | −48 |

Friction Coefficients of Base Stock

The friction coefficient of the product base stock was measured using HFRR (high frequency reciprocating rig) test. The friction coefficient of the product was 0.11 while, the friction coefficient of 10 cSt PA( )under same measurement conditions was 0.13. This substantial difference in friction coefficient reflects the energy efficiency of the base stock. The results are set forth below in Table 28. Even though Example 16 had a higher $Kv_{100}$ and $Kv_{40}$ compared to PAO10 in Table 27, it yielded significantly lower friction coefficient than PAO10, which is unexpected and surprising.

TABLE 28

(The Friction Coefficient of Base Stocks of Example 16 and Control)

| Sample # | Friction Coefficient (FC) |
|---|---|
| Example 16 (25872-14) | 0.11 |
| PAO 4 | 0.13 |

Epoxide-terminated hydrocarbon molecules (glycidyl ethers containing varying alkyl groups) can be reacted with polyether amines to obtain low molecular weight fluids that can be used as synthetic base stock. For example, glycidyl ether ($C_8/C_{10}$) can be reacted with polytetrahydrofuran-based Jeffamine® (MW of 350) to obtain a liquid product that had excellent lube properties.

The reaction of amine-terminated polyethers and epoxides can be carried out neat or in solvents like THF, MEK or ethanol. The temperature of the reaction can be 25° C. to 60° C. or higher. The reaction time can be a few hours to few days.

Example 17

Lubricant Compositions Including PAG Block Copolymers

The Jeffamine® 1 additive synthesized in Example 1 was blended at a 3 wt % concentration in a Delvac MX 15W40 formulated oil and was evaluated in the Sequence IIIE screener at 204 hours with alternating air and nitrogen flow, air (500 mL/min for 16 hours) and nitrogen (500 mL/min for 8 hours) with iron catalyst. Delvac MX 15W-40 is a fully formulated heavy duty mineral based commercial engine oil of a 15W-40 viscosity grade. The base oil used in Delvac MX 15W-40 is a blend of a Group I and Group II base oils. The Group I oil comprises 53 wt % of the engine oil and has a KV100 of 5 cSt. The Group II oil comprises 20 wt % of the engine oil and includes 8 wt % of a 11 cSt KV100 Group II oil and 12 wt % of a 5 cSt KV100 Group II oil. Delvac MX 15W-40 also includes 17 wt % of an additive package (Infineum D3426), which includes antioxidants, dispersants, detergents and antiwear agents. The balance (6-7 wt %) of Delvac MX 15W-40 is an olefin copolymer type viscosity modifier. A comparative control oil (Delvac MX 15W-40) without the Jeffamine® 1 was also evaluated in this test under the same conditions. Results are below:

Oxidative Stability of Lubricant Composition

Oxidative stability was evaluated in a bench oxidation test. In the bench oxidation test a series of test tubes are filled with 100 g of the lubricating composition and an iron catalyst, and heated at 100° C. Air and nitrogen are bubbled through the lubricating composition in each test tube in alternating intervals, with air at 500 mL/min for 16 hours and then nitrogen at 500 mL/min for 8 hours. The kinematic viscosity at 40° C. of the composition is measured according to the ASTM D445 standard at approximately daily intervals. The oxidative stability results of the lubricant composition of Example 17 and the control (without the Jeffamine® 1) are shown in Table 29 and plotted in FIG. 1. The Jeffamine® containing oil increased the oxidative stability of the oil by 27% relative to the control at the 167 hours test time. Under severe oxidative conditions and extended oxidation times, the inventive oil is significantly improved in terms of oxidative stability as measured by $Kv_{40}$ as a function of time relative to the comparative oil. It is expected that this increase in stability will extend exponentially with time in this test.

TABLE 29

Oxidative Stability of Oil Composition and Control

| Time (hrs.) | Comparative Oil 1 (Commercial 15W40 oil) (cSt) Kinematic Viscosity at 40° C. (Kv40) | Inventive Oil 1 (Commercial 15W40 oil with 3 wt % fluid of Example 1) (cSt) Kinematic Viscosity at 40° C. (Kv40) |
|---|---|---|
| 48 | 104.95 | 116.81 |
| 72 | 114.35 | 127.58 |
| 100 | 138.71 | 147.34 |
| 119 | 168.37 | 168.9 |
| 143 | 240.87 | 218.24 |
| 167 | 460.95 | 339 |

Frictional Properties And Wear Resistance of Lubricant Composition

The friction properties and wear resistance results of the lubricant composition of Example 17 and the control (without the Jeffamine® 1) are shown in Table 30. The average friction coefficient and wear scar were measured using a High Frequency Reciprocating Rig (HFRR) test. The HFRR test method measures the lubricity, or ability of a fluid to affect friction between surfaces in relative motion under a load. The test method used was based on a modification of ASTM D6079. The HFRR is manufactured by PCS Instruments and identified as model HFR2 (AutoHFRR). The test equipment and procedure are similar to the ASTM D6079 method, except the test oil temperature is raised from 32° C. to 195° C. at 2° C./minute, 400 g load, 60 Hz frequency, and 0.5 mm stroke length.

Lubricant fuel/energy efficiency has been identified as an important feature for future lubricants. To provide step-out fuel economy while maintaining or improving other performance features for lubricants, lower friction coefficients and lower wear scar are needed. The Jeffamine® containing inventive oil in Table 30 showed significant wear protection improvement and reduced friction relative to the control/comparative oil in the HFRR test in Table 30, which is unexpected and surprising.

TABLE 30

Wear Scar and Friction Coefficient of Oil Composition and Control

| Fluid | Wear Scar(Microns) | HFRR Friction Coefficient @ 70 C. |
|---|---|---|
| Comparative oil (Commercial 15W40 oil) | 175 | 0.167 |
| Inventive Oil (Commercial 15W40 oil with 3 wt % additive fluid of Example 1) | 144 | 0.151 |

All documents described herein are incorporated by reference herein, including any priority documents and/or testing procedures to the extent they are not inconsistent with this text, provided, however, that any priority document not named in the initially filed application or filing documents is NOT incorporated by reference herein. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. The invention has been described above with reference to numerous embodiments and specific examples. Many variations will suggest themselves to those skilled in this art in light of the above detailed description. All such obvious variations are within the full intended scope of the appended claims.

What is claimed is:

1. A lubricant composition for use in engine oil applications comprising:
   i) a first base stock selected from a Group I base stock, a Group II base stock and a combination thereof at 50 to 80 wt % of the lubricant composition,
   ii) a block copolymer, comprising:
   an "A" block of a functionalized hydrocarbon moiety including one or more functional end groups selected from: epoxides, amines, acids, acid chlorides, acid anhydrides, halogens, vinyl or vinylidene double bonds, aromatic rings and thiols; and
   a "B" block of a functionalized polyether moiety including one or more functional end groups selected from: epoxides, amines, acids, acid chlorides, acid anhydrides, halogens, vinyl or vinylidene double bonds, aromatic rings and thiols,
   wherein the end group of the polyether moiety is different than the end group of the hydrocarbon moiety, wherein the hydrocarbon moiety and the polyether moiety are copolymerizable therewith, wherein the block copolymer ranges from 1 to 10 wt % of the lubricant composition,
   iii) a viscosity modifier at 3 to 15 wt % of the lubricant composition selected from polymers and copolymers of methacrylate, butadiene, olefins and alkylated styrenes, and
   iv) an additive package including a combination of antioxidants, dispersants, detergents, friction modifiers and antiwear agents, wherein the additive package ranges from 2 to 30 wt % of the lubricant composition.

2. The lubricant composition of claim 1, wherein said hydrocarbon moiety is a poly-α-olefin and said polyether moiety is a polyalkylene glycol.

3. The lubricant composition of claim 2, wherein the polyalkylene glycol is difunctional and the poly-α-olefin is difunctional.

4. The lubricant composition of claim 3, wherein the polyalkylene glycol is a difunctional amine and the poly-α-olefin is a difunctional epoxide.

5. The lubricant composition of claim 4, wherein the polyalkylene glycol is a polyether amine.

6. The lubricant composition of claim 5, wherein the polyether amine is at least one amine selected from the group consisting of:
   poly(propyleneglycol) bis(2-aminopropylether), and poly(propyleneglycol)-block-poly(ethyleneglycol)-block-poly(propyleneglycol) bis(2-aminopropylether).

7. The lubricant composition of claim 2, wherein the hydrocarbon moiety is an alkyl glycidyl ether, Armin amine or dioctylamine.

8. The lubricant composition of claim 1, comprising a diblock copolymer.

9. The lubricant composition of claim 1, comprising a repeating diblock copolymer.

10. The lubricant composition of claim 1, wherein the block copolymer has an average molecular weight of 200 to 20000.

11. The lubricant composition of claim 10, wherein the block copolymer has an average molecular weight of 250 to 5000.

12. The lubricant composition of claim 1, further including a second base stock selected from: a metallocene poly-α-olefin, a poly-α-olefin, a GTL base stock, and a Group III base stock.

13. The lubricant composition of claim 1, wherein the oxidative stability as measured by bench oxidation test at 167 hours yields a kinematic viscosity at 40° C. of less than or equal to 400 cSt.

14. The lubricant composition of claim 1, wherein the wear resistance as measured by wear scar using a High Frequency Reciprocating Rig (HFRR) test is less than or equal to 170 microns.

15. The lubricant composition of claim 1, wherein the average friction coefficient at 70° C. measured using a High Frequency Reciprocating Rig (HFRR) test is less than or equal to 0.165.

16. The lubricant composition of claim 1, wherein the first base stock is a combination of a Group I base stock at 53 wt % of the lubricant composition and a Group II base stock at 20 wt % of the lubricant composition.

17. The lubricant composition of claim 16, wherein the block copolymer is polyether amine at 3 wt % of the lubricant composition.

18. The lubricant composition of claim 17, wherein the viscosity modifier is an olefin copolymer at 7 wt % of the lubricant composition.

19. The lubricant composition of claim 18, wherein the additive package is at 17 wt % of the lubricant composition.

20. The lubricant composition of claim 19, wherein the oxidative stability as measured by bench oxidation test at 167 hours yields a kinematic viscosity at 40° C. of 339 cSt, a wear resistance as measured by wear scar using a High Frequency Reciprocating Rig (HFRR) test of 144 microns, and an average friction coefficient at 70° C. as measured using a HFRR test of 0.151.

21. The lubricant composition of claim 1, wherein the antioxidants include one or more aminic antioxidants, one or more phenolic antioxidants, one or more oil-soluble copper complexes and combinations thereof at a loading in the composition of from 0.2 wt % to 6 wt %.

22. The lubricant composition of claim 1, wherein the friction modifiers include one or more metal-containing friction modifiers, one or more ashless friction modifiers and combinations thereof at loading in the composition of from 0.1 wt % to 5 wt %.

23. The lubricant composition of claim 1, wherein the lubricant composition has a higher kinematic viscosity ($Kv_{100}$ and $Kv_{40}$) and a lower friction coefficient than a comparable composition not including the block copolymer.

24. A method of making a lubricant composition for use in engine oil applications comprising:
providing the following components:
i) a first base stock including a Group I base stock, a Group II base stock or a combination thereof,
ii) a block copolymer, comprising:
an "A" block of a functionalized hydrocarbon moiety including one or more functional end groups selected from the group consisting of: epoxides, amines, acids, acid chlorides, acid anhydrides, halogens, vinyl or vinylidene double bonds, aromatic rings and thiols; and
a "B" block of a functionalized polyether moiety including one or more functional end groups selected from the group consisting of: epoxides, amines, acids, acid chlorides, acid anhydrides, halogens, vinyl or vinylidene double bonds, aromatic rings and thiols,
wherein the end group of the polyether moiety is different than the end group of the hydrocarbon moiety, wherein the hydrocarbon moiety and the polyether moiety are copolymerizable therewith,
iii) a viscosity modifier selected from polymers and copolymers of methacrylate, butadiene, olefins and alkylated styrenes, and
iv) an additive package including a combination of antioxidants, dispersants, detergents friction modifiers and antiwear agents; and
blending the first base stock at 50 to 80 wt % of the lubricant composition, the block copolymer at from 1 to 10 wt % of the lubricant composition, the viscosity modifier at 3 to 15 wt % of the lubricant composition, and the additive package at from 2 to 30 wt % of the lubricant composition to form the lubricant composition.

25. The method of claim 24, wherein the oxidative stability of the lubricant composition as measured by bench oxidation test at 167 hours yields a kinematic viscosity at 40° C. of less than or equal to 400 cSt.

26. The method of claim 24, wherein the wear resistance of the lubricant composition as measured by wear scar using a High Frequency Reciprocating Rig (HFRR) test is less than or equal to 170 microns.

27. The method of claim 24, wherein the average friction coefficient at 70° C. of the lubricant composition measured using a High Frequency Reciprocating Rig (HFRR) test is less than or equal to 0.165.

28. The method of claim 24, wherein the antioxidants include one or more aminic antioxidants, one or more phenolic antioxidants, one or more oil-soluble copper complexes and combinations thereof at a loading in the composition of from 0.2 wt % to 6 wt %.

29. The method of claim 24, wherein the friction modifiers include one or more metal-containing friction modifiers, one or more ashless friction modifiers and combinations thereof at loading in the composition of from 0.1 wt % to 5 wt %.

30. The method of claim 24, wherein the lubricant composition has a higher kinematic viscosity ($Kv_{100}$ and $Kv_{40}$) and a lower friction coefficient than a comparable composition not including the block copolymer.

* * * * *